(12) United States Patent
Ishida et al.

(10) Patent No.: US 9,027,691 B2
(45) Date of Patent: May 12, 2015

(54) DRIVING UNIT AND ELECTRIC ASSIST BICYCLE

(71) Applicant: Yamaha Hatsudoki Kabushiki Kaisha, Iwata-shi, Shizuoka (JP)

(72) Inventors: Hiroyasu Ishida, Shizuoka (JP); Noriyasu Ishikawa, Shizuoka (JP); Shinnosuke Moji, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/103,978

(22) Filed: Dec. 12, 2013

(65) Prior Publication Data

US 2014/0166384 A1 Jun. 19, 2014

(30) Foreign Application Priority Data

Dec. 17, 2012 (JP) ................... 2012-275111

(51) Int. Cl.
*B62M 6/50* (2010.01)
*B62M 6/55* (2010.01)

(52) U.S. Cl.
CPC ... *B62M 6/50* (2013.01); *B62M 6/55* (2013.01)

(58) Field of Classification Search
CPC .......... A01B 12/006; B62M 6/50; B62M 6/55
USPC ............. 180/206.3, 206.1, 206.6, 205.3, 221, 180/220; 73/862.041, 862.08
See application file for complete search history.

(56) References Cited

U.S. PATENT DOCUMENTS 3,138,970 A * 6/1964 Costa et al. ............... 475/86
6,247,548 B1 * 6/2001 Hayashi et al. ........... 180/206.2

FOREIGN PATENT DOCUMENTS

| EP | 0 697 330 A1 | 2/1996 |
|---|---|---|
| EP | 0 798 204 A1 | 10/1997 |
| EP | 2 689 998 A1 | 1/2014 |
| JP | 08-058670 A | 3/1996 |
| JP | 2002-154474 A | 5/2002 |
| JP | 2003-231492 A | 8/2003 |
| JP | 2009-208710 A | 9/2009 |
| WO | 02/076813 A1 | 10/2002 |
| WO | 20121127782 A1 | 9/2012 |

OTHER PUBLICATIONS

Official Communication issued in corresponding European Patent Application No. 13196670.7, mailed on Mar. 27, 2014.

* cited by examiner

*Primary Examiner* — Joseph Rocca
*Assistant Examiner* — Marlon Arce
(74) *Attorney, Agent, or Firm* — Keating & Bennett, LLP

(57) ABSTRACT

A driving unit for use in an electric assist bicycle includes a rotation detection device in addition to a torque detection device such that the detection resolution of the rotation detection device is increased. The driving unit includes a housing, a crankshaft, a torque detection device, a rotating member, and a rotation detection device. The rotating member includes a connecting shaft and an output shaft. The connecting shaft is located at one of the ends of the rotating member disposed along its axis, and is coupled with the crankshaft in the housing. The output shaft is located at the other one of the ends of the rotating member disposed along its axis. The rotation detection device includes a detected portion and a detector. The detected portion is provided on the rotating member, and located around the central axis of the crankshaft in the housing.

6 Claims, 14 Drawing Sheets

DRIVING UNIT AND ELECTRIC ASSIST BICYCLE

BACKGROUND OF THE INVENTION

1. Field of the Invention

The present invention relates to a driving unit for use in an electric assist bicycle, and an electric assist bicycle including the driving unit.

2. Description of the Related Art

Recently, electric assist bicycles have been disclosed that assist the rider by augmenting the pedaling force of the rider (hereinafter referred to as "tread force") with a driving force of an electric motor. An electric assist bicycle includes a torque detection device. The torque detection device measures the torque generated in the crankshaft when the rider pedals the bicycle. When a torque larger than a predetermined reference value continues to be generated for a certain period of time, the electric assist bicycle assists the rider by augmenting the tread force with a driving force by the electric motor.

Some electric assist bicycles include a rotation detection device to detect rotation of the crankshaft, in addition to a torque detection device. For example, JP-Hei 8-58670 A discloses an electric assist bicycle including a tread force detection device and a crankshaft rotation sensor. The tread force detection device includes a torque/displacement converting device that converts torsion by a tread force into an axial displacement and a stroke sensor that outputs an electric signal corresponding to the displacement. The torque/displacement converting device works by engaging the convex cam surface provided on the end surface of a slider inner side that rotates together with the crankshaft with the concave cam surface provided on the end surface of the driving member. The crankshaft rotation number sensor detects, in an optical or magnetic manner, a cog provided on the periphery of a collar that couples the crankshaft with the head of the torsion bar and outputs a detection pulse.

As discussed above, the electric assist bicycle assists the rider by augmenting the tread force with the driving force from the electric motor. To assist the rider in a manner that corresponds to the pedaling of the rider, for example, a rotation detection device may be provided in addition to a torque detection device, and the detection resolution of the rotation detection device may be increased.

In JP-Hei 8-58670 A, the number of cogs must be increased in order to increase the detection resolution of the crankshaft rotation sensor. However, in JP-Hei 8-58670 A, the cogs are provided on the collar that couples the crankshaft with the head of the torsion bar. As such, it is unrealistic to increase the number of cogs to increase the detection resolution.

SUMMARY OF THE INVENTION

A preferred embodiment of the present invention provides a driving unit for use in an electric assist bicycle that includes a rotation detection device in addition to a torque detection device, wherein the detection resolution of the rotation detection device is increased.

Another preferred embodiment of the present invention provides an electric assist bicycle including the driving unit.

The driving unit according to a preferred embodiment of the present invention may be used in an electric assist bicycle and includes a housing, a crankshaft, a magnetostrictive torque detection device, a rotating member, and a magnetic rotation detection device.

The crankshaft extends through the housing. The torque detection device is located in the housing to detect a torque generated in the crankshaft. The rotating member includes the torque detection device, and is concentric with the crankshaft and rotatable together with the crankshaft. The rotation detection device is located in the housing to detect the rotation of the crankshaft.

The rotating member includes a connecting shaft and an output shaft. The connecting shaft is located at one of the ends of the rotating member disposed along its axis and is coupled with the crankshaft within the housing. The output shaft is located at the other one of the ends of the rotating member disposed along its axis, and a driving sprocket is attached to the output shaft.

The rotation detection device includes a detected portion and a detector. The detected portion is provided on the rotating member and located around the central axis of the crankshaft within the housing. The detector detects that the detected portion rotates together with the rotating member. The detected portion is provided in a position different from that of the torque detection device as measured in an axial direction of the crankshaft.

In the driving unit according to preferred embodiments of the present invention, the detection resolution of the rotation detection device is increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
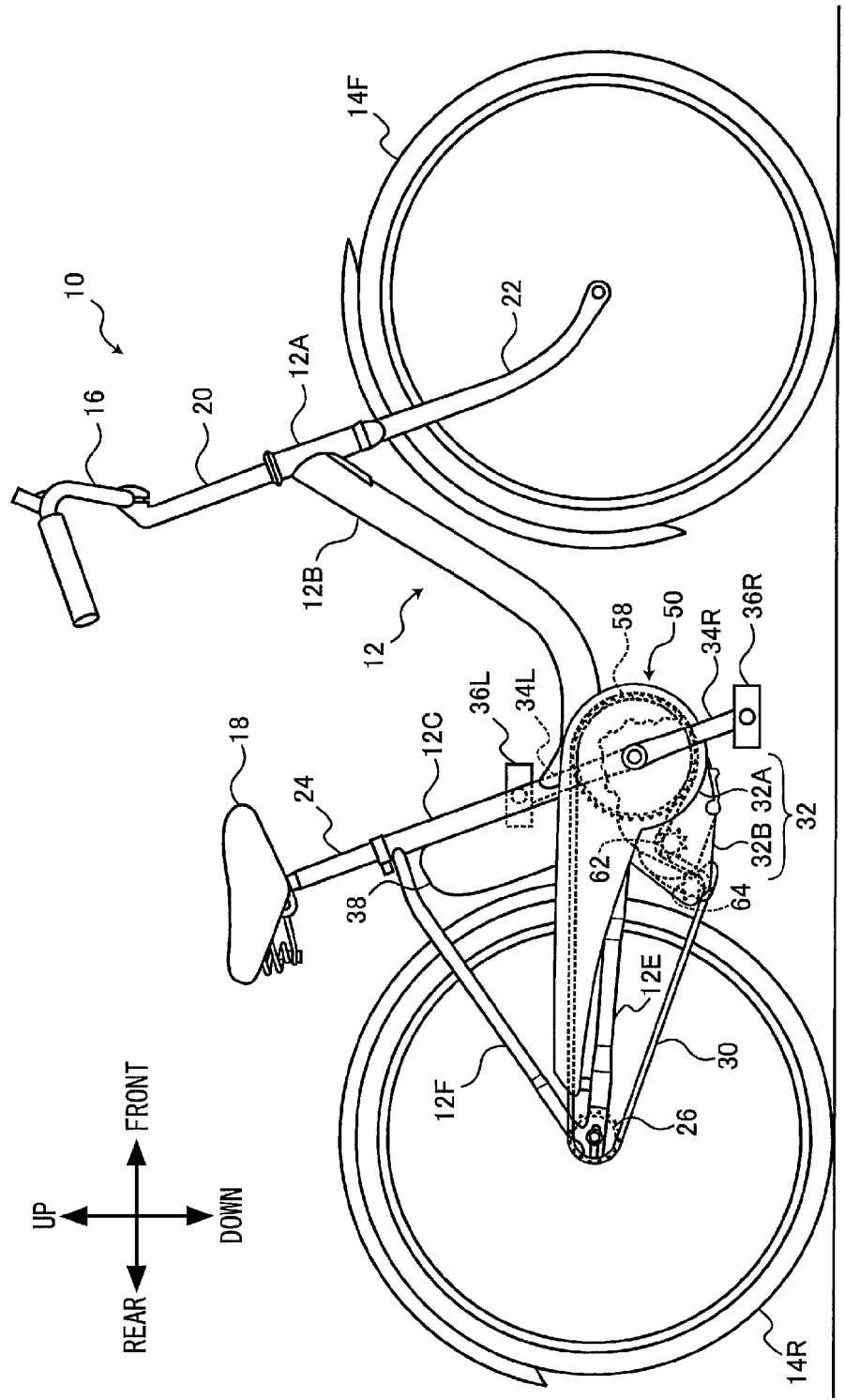
FIG. 1 is a schematic right side view of an electric assist bicycle according to a first preferred embodiment of the present invention.

Now, driving units and electric assist bicycles according to various preferred embodiments of the present invention will be described with reference to the drawings. The same or corresponding components are labeled with the same reference characters throughout the drawings, and their description will not be repeated. The sizes of the components in the drawings do not exactly represent the sizes and size ratios of the actual components. In the following description, front/forward, rear/rearward, left and right are directions as perceived by the rider sitting on the saddle 18 and grasping the handlebars 16.

First Preferred Embodiment

Figure 2:
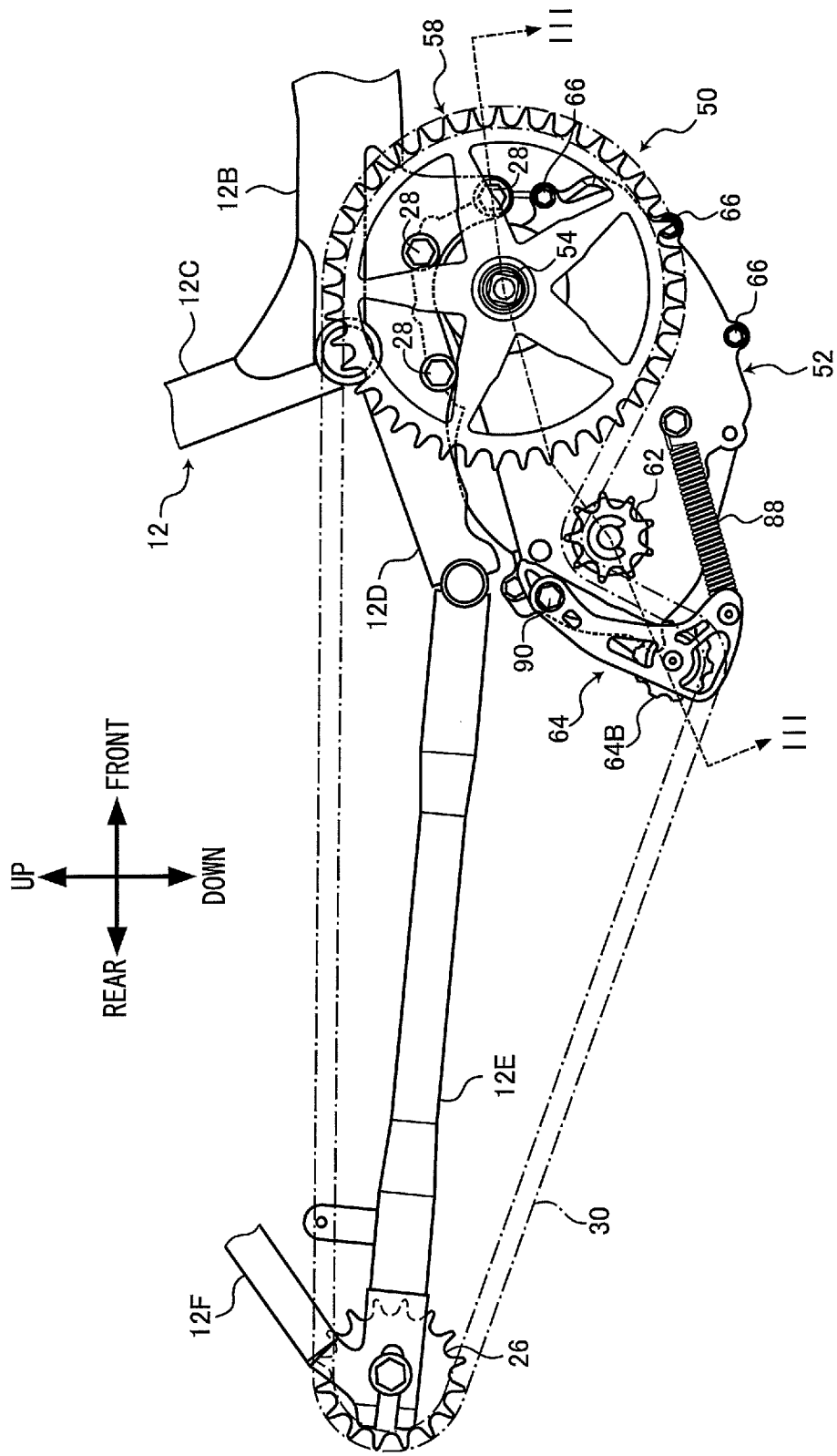
FIG. 2 is a schematic view of a driving unit and a driven sprocket.

An electric assist bicycle 10 according to a first preferred embodiment of the present invention will be described with reference to FIGS. 1 and 2. FIG. 1 is a schematic right side view of the electric assist bicycle 10. FIG. 2 is a schematic view of a driving unit 50 and driven sprocket 26 included in the electric assist bicycle 10.

As shown in FIG. 1, the electric assist bicycle 10 includes a body frame 12, a front wheel 14F, a rear wheel 14R, handlebars 16, a saddle 18, and a driving unit 50.

The body frame 12 includes a head pipe 12A, a down frame 12B, a seat frame 12C, a bracket 12D (see FIG. 2), a pair of chain stays 12E, and a pair of seat stays 12F.

The head pipe 12A is located in a front portion of the electric assist bicycle 10 and extends in a top-to-bottom direction. A stem 20 is rotatably inserted into the head pipe 12A. The handlebars 16 are fixed to the top end of the stem 20. A front fork 22 is fixed to the bottom end of the stem 20. A front wheel 14F is rotatably attached to the bottom end of the front fork 22.

The down frame 12B is located rearward of the head pipe 12A and extends in a front-to-rear direction. The front end of the down frame 12B is connected with the head pipe 12A. The rear end of the down frame 12B is connected with the bottom end of a seat frame 12C that extends in a top-to-bottom direction.

A seat pipe 24 is inserted into the seat frame 12C. The saddle 18 is attached to the top end of the seat pipe 24.

As shown in FIG. 2, the bracket 12D is attached to a rear portion of the seat frame 12C. The pair of chain stays 12E are attached to a rear portion of the bracket 12D.

As shown in FIG. 1, the pair of chain stays 12E extend in a front-to-rear direction. A rear wheel 14R is located between the chain stays 12E. The rear wheel 14R is rotatably attached to the rear end of each of the chain stays 12E. The driven sprocket 26 is located to the right of the rear wheel 14R. The driven sprocket 26 is coupled with the rear wheel 14R via a one-way clutch, not shown.

The seat stays 12F extend in a front-to-rear direction. The front end of each of the seat stays 12F is connected with the top end of the seat frame 12C. The rear end of the seat stay 12F located to the right of the rear wheel 14R is connected with the rear end of the chain stay 12E located to the right of the rear wheel 14R. The rear end of the seat stay 12F located to the left of the rear wheel 14R is connected with the rear end of the chain stay 12E located to the left of the rear wheel 14R As shown in FIG. 2, the driving unit 50 is fixed to the bracket 12D by a plurality of fasteners 28. Details of the driving unit 50 will be discussed below.

As shown in FIGS. 1 and 2, an endless chain 30 is wound around the driving sprocket 58 included in the driving unit 50 and the driven sprocket 26.

As shown in FIG. 1, a chain cover 32 is attached to the body frame 12. The chain cover 32 covers the driving unit 50 and chain 30. The chain cover 32 includes a main cover 32A and an auxiliary cover 32B. The main cover 32A covers the right side of the driving sprocket and extends in a front-to-rear direction. The auxiliary cover 32B covers the right side of a rear portion of the driving unit 50.

As shown in FIG. 1, an end of a crankarm 34R is attached to one of the ends of the crankshaft 54, disposed along its axis, included in the driving unit 50, while an end of a crankarm 34L is attached to the other one of the ends thereof disposed along its axis. A pedal 36R is attached to the other end of the crankarm 34R, while a pedal 36L is attached to the other end of the crankarm 34L.

As shown in FIG. 1, a battery unit 38 that supplies electric power to the electric motor (see FIG. 3) of the driving unit 50 is located rearward of the seat frame 12C. The battery unit 38 includes a battery and a controller. The battery is a rechargeable battery that can be charged and discharged. The controller controls the charge and discharge of the battery and monitors the output current and remaining level of the battery.

Figure 3:
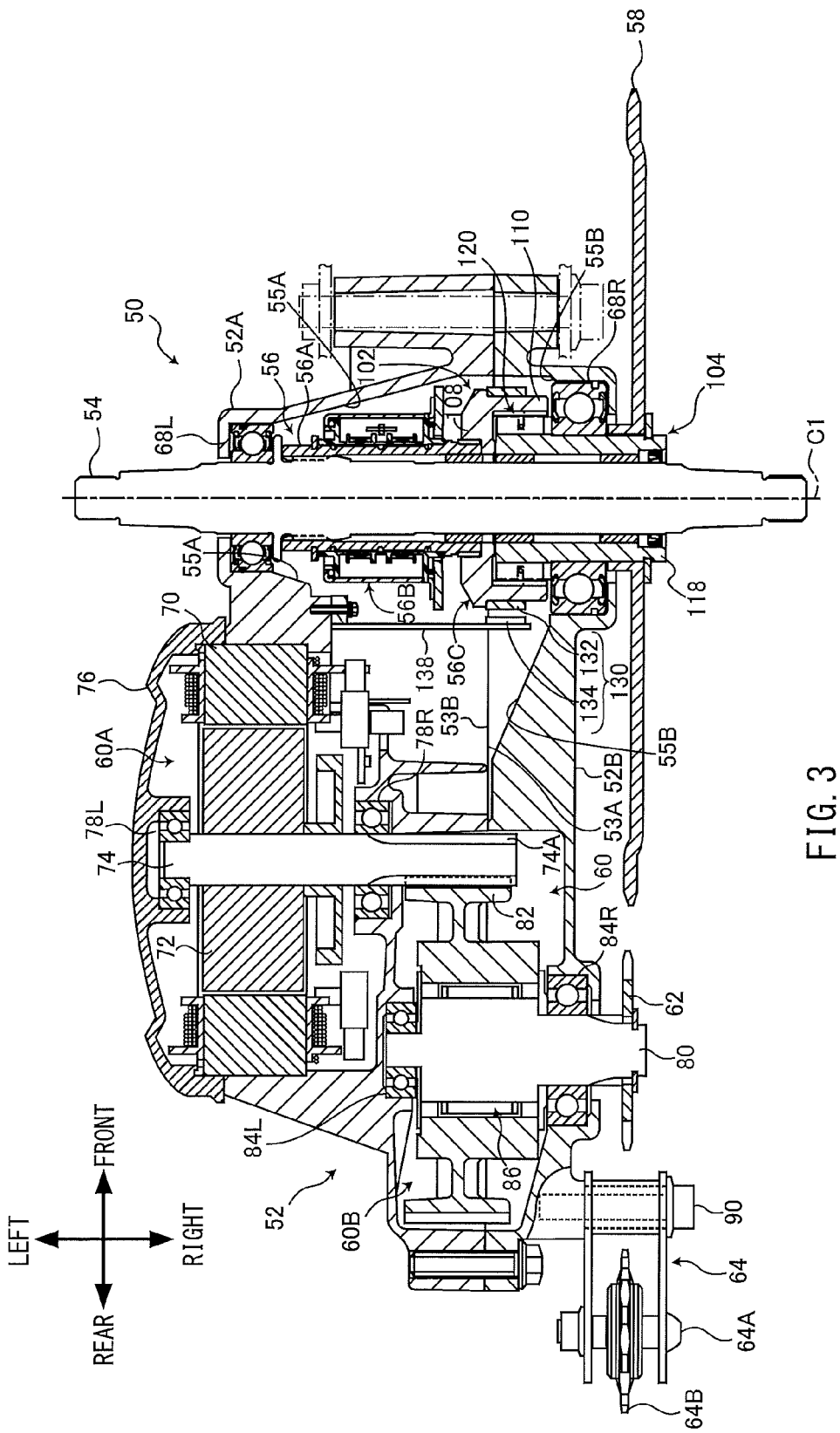
FIG. 3 is a cross-sectional view taken along line III-III of FIG. 2.

Next, the driving unit 50 will be described with reference to FIG. 3. FIG. 3 is a schematic vertical cross-section of the driving unit 50, and is a cross-sectional view taken along line III-III of FIG. 2.

The driving unit 50 includes a housing 52, a crankshaft 54, a rotating member 56, a drive power generator 60, an auxiliary sprocket 62, and a chain tensioner 64.

The housing 52 includes a first housing portion 52A and a second housing portion 52B. The first and second housing portions 52A and 52B are joined together from the left and right, and are fixed to each other by a plurality of fasteners 66. The housing 52 is attached to the bracket 12D by the fasteners 28.

The housing 52 will be described in more detail. The first housing portion 52A includes an overlay surface 53A. The second housing portion 52B includes an overlay surface 53B. The overlay surfaces 53A and 53B are perpendicular or substantially perpendicular to the axis of the crankshaft 54. When the first and second housing portions 52A and 52B are joined together, the overlay surfaces 53A and 53B are overlaid on each other. That is, the first and second housing portions 52A and 52B are overlaid so as to be arranged in an axial direction of the crankshaft 54.

The first and second housing portions 52A and 52B are preferably made by casting, for example. In the present preferred embodiment, the first and second housing portions 52A and 52B are preferably made by die-casting, for example.

The crankshaft 54 is located in a front portion of the housing 52 and extends through the housing 52 in a left-to-right direction. The crankshaft 54 is rotatably supported by a first bearing 68L and a second bearing 68R. The first bearing 68L is located closer to one of the ends of the crankshaft 54 disposed along its axis than the rotating member 56 is (i.e., to the left), and is fixed to the first housing portion 52A. The second bearing 68R is located closer to the other one of the ends of the crankshaft 54 disposed along its axis than the first bearing 68L is (i.e., to the right) and is fixed to the second housing portion 52B.

In the present preferred embodiment, the first and second housing portions 52A and 52B are preferably made by die-casting. Accordingly, a slope 55A that facilitates stripping is located near portions of the first housing portion 52A that support the first bearing 68L, while a slope 55B that facilitates stripping is located near portions of the second housing portion 52B that support the second bearing 68R.

The crankshaft 54 extends through the rotating member 56. The driving sprocket 58 is located outside the housing 52 and to the right of the housing 52, and rotates together with the rotating member 56. The rotating member 56 will be detailed below.

The driving force generator 60 is located inside the housing 52 and rearward of the crankshaft 54. The driving force generator 60 includes an electric motor 60A and an output member 60B.

The electric motor 60A generates an assist driving force that assists the rider in riding the electric assist bicycle 10 based on control signals supplied by a control device, not shown. The electric motor 60A also changes the assist driving force according to the assist mode selected by the rider.

The electric motor 60A includes a stator 70, a rotor 72, and a rotating shaft 74. The stator 70 is fixed to the first housing portion 52A. A cover 76 is attached to the first housing portion 52A to cover the left side of the electric motor 60A. The rotor 72 is located inward of the stator 70. The rotating shaft 74 is positioned to extend through the rotor 72 and fixed to the rotor 72. The rotating shaft 74 is rotatably supported by bearings 78L and 78R. The bearing 78L is located at one of the ends of the rotor 72 disposed along its axis (i.e., to the left) and is fixed to the cover 76. The bearing 78R is located at the other one of the ends of the rotor 72 disposed along its axis (i.e. to the right) and is fixed to the first housing portion 52A. A gear 74A is provided on the other one of the ends of the rotating shaft 74 disposed along its axis.

The output member 60B is located inside the housing 52 and rearward of the crankshaft 54. The output member 60B includes an output shaft 80 and an output gear 82.

The output shaft 80 is located rearward of the rotating shaft 74. The output shaft 80 is rotatably supported by bearings 84L and 84R. The bearing 84L is located at one of the ends of the output shaft 80 disposed along its axis (i.e., to the left) and is fixed to the first housing portion 52A. The bearing 84R is located closer to the other one of the ends of the output shaft 80 disposed along its axis than the bearing 84L is (i.e., to the right) and is fixed to the second housing portion 52B.

The opening shaft 80 is positioned to extend through the output gear 82. The output gear 82 is located between the bearing 84L and bearing 84R. The output gear 82 engages the gear 74A. This allows the assist driving force generated by the electric motor 60A to be transferred to the output gear 82 via the rotating shaft 74. As a result, the output gear 82 rotates. The rotating shaft 64 rotates forward. As a result, the output gear 82 rotates rearward.

A latch mechanism 86 is provided between the output shaft 80 and output gear 82. As such, a rearward rotational force of the output gear 82 can be transferred to the output axis 80, while a forward rotational force of the output gear 82 cannot be transferred to the output axis 80.

The auxiliary sprocket 62 is fixed to the other one of the ends of the output axis 80 disposed along its axis, and is located outside the housing 52 and to the right of the housing 52. The auxiliary drive force generated by the electric motor 60A is transferred to the auxiliary sprocket 62 via the output shaft 80. As a result, the auxiliary sprocket 62 rotates rearward.

The chain tensioner 64 is located at a rear portion of the right side of the second housing portion 52B. As shown in FIG. 2, an end of the chain tensioner 64 is attached to the second housing portion 52B via a tension spring 88. The other end of the chain tensioner 64 is rotatably attached to the second housing portion 52B by a support bolt 90, for example. The chain tensioner 64 includes a tension sprocket 64B that can be rotated about a support bolt 64A. The chain 30 is wound around the tension sprocket 64B. The chain 30 pushes the tension sprocket 64B rearward. As a result, an appropriate tension is applied to the chain 30.

Figure 4:
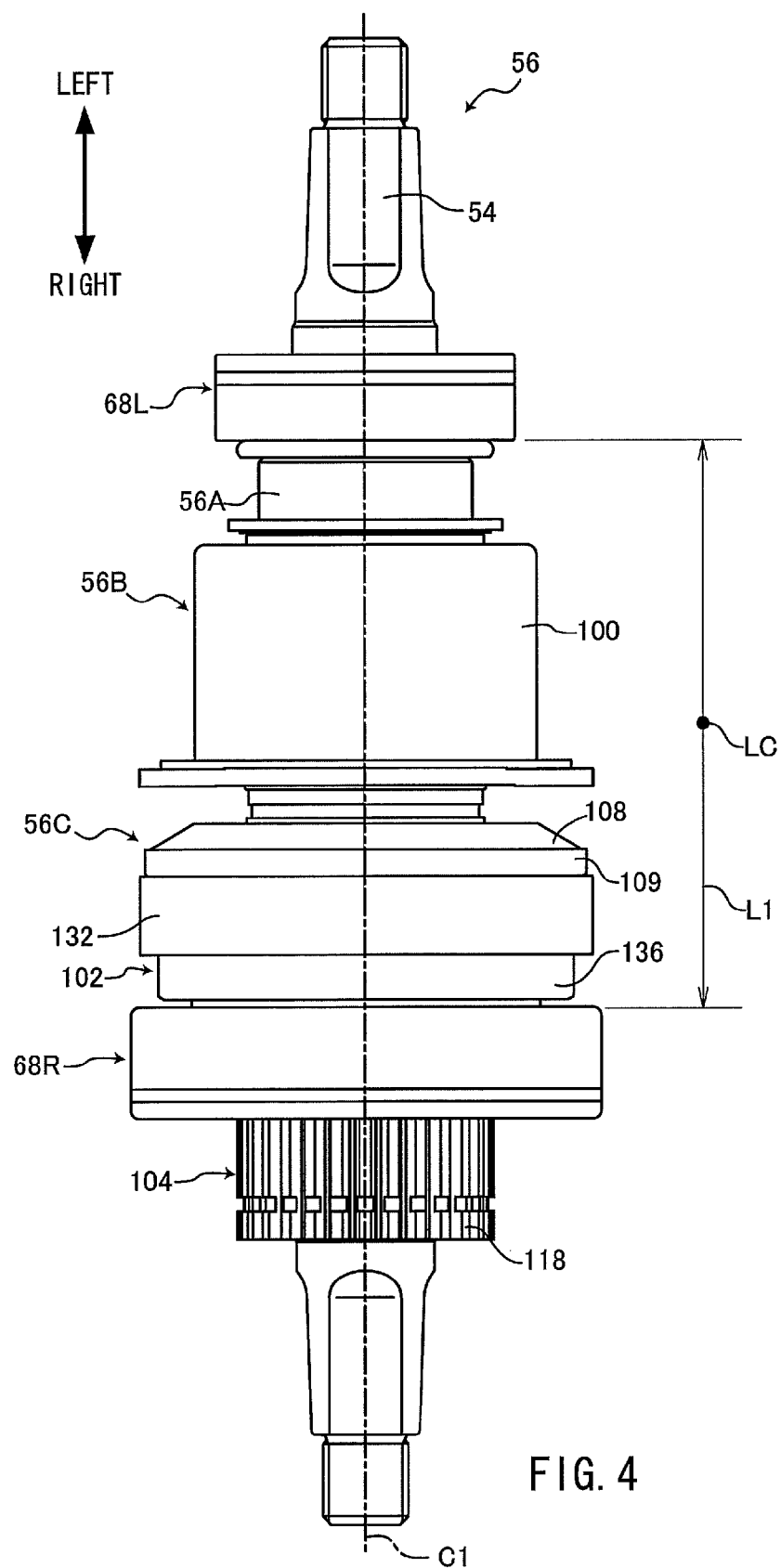
FIG. 4 is a side view of a rotating member with the crankshaft inserted therethrough.
Figure 5:
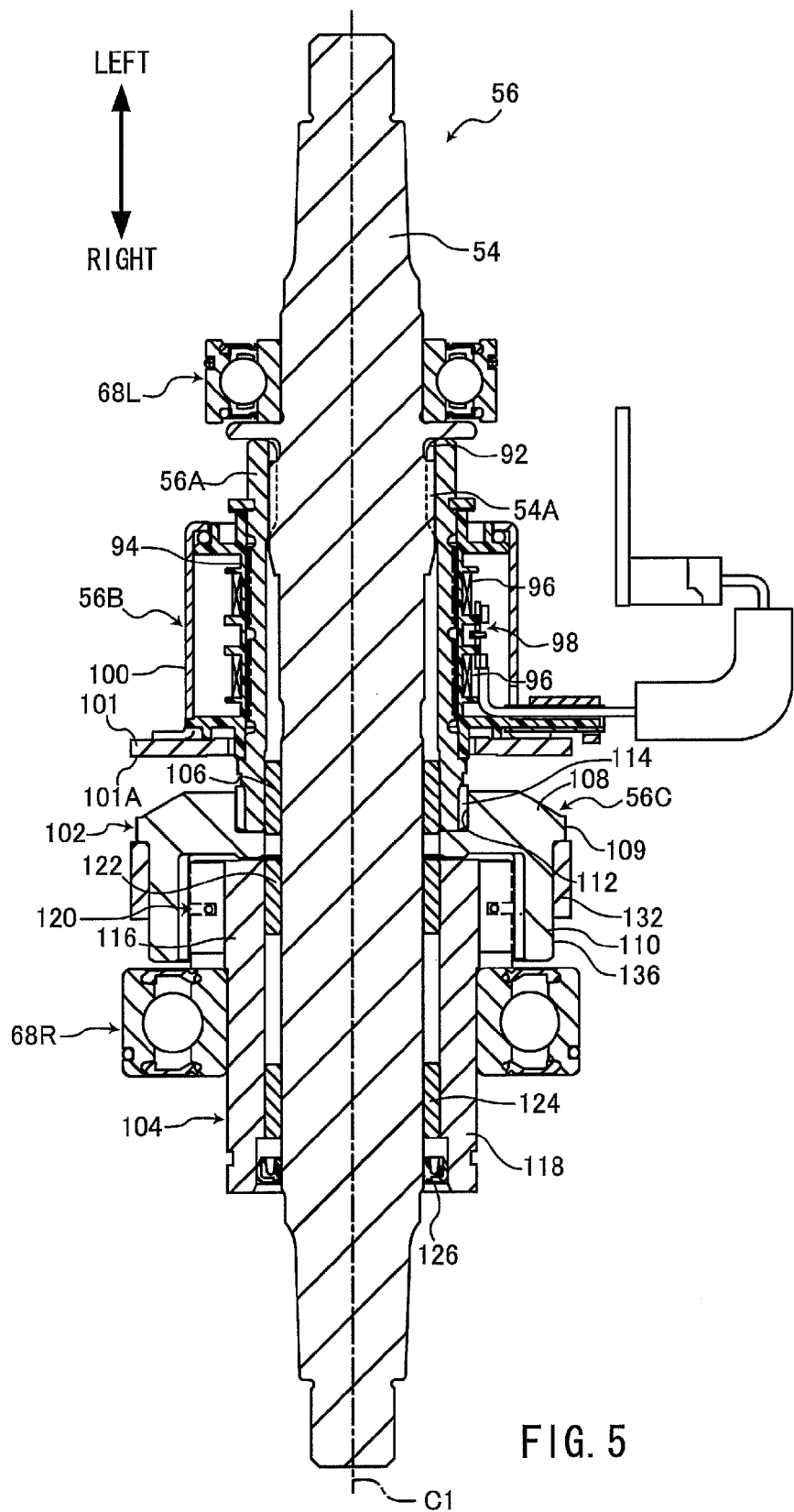
FIG. 5 is a cross-sectional view of the rotating member with the crankshaft inserted therethrough.
Figure 6:
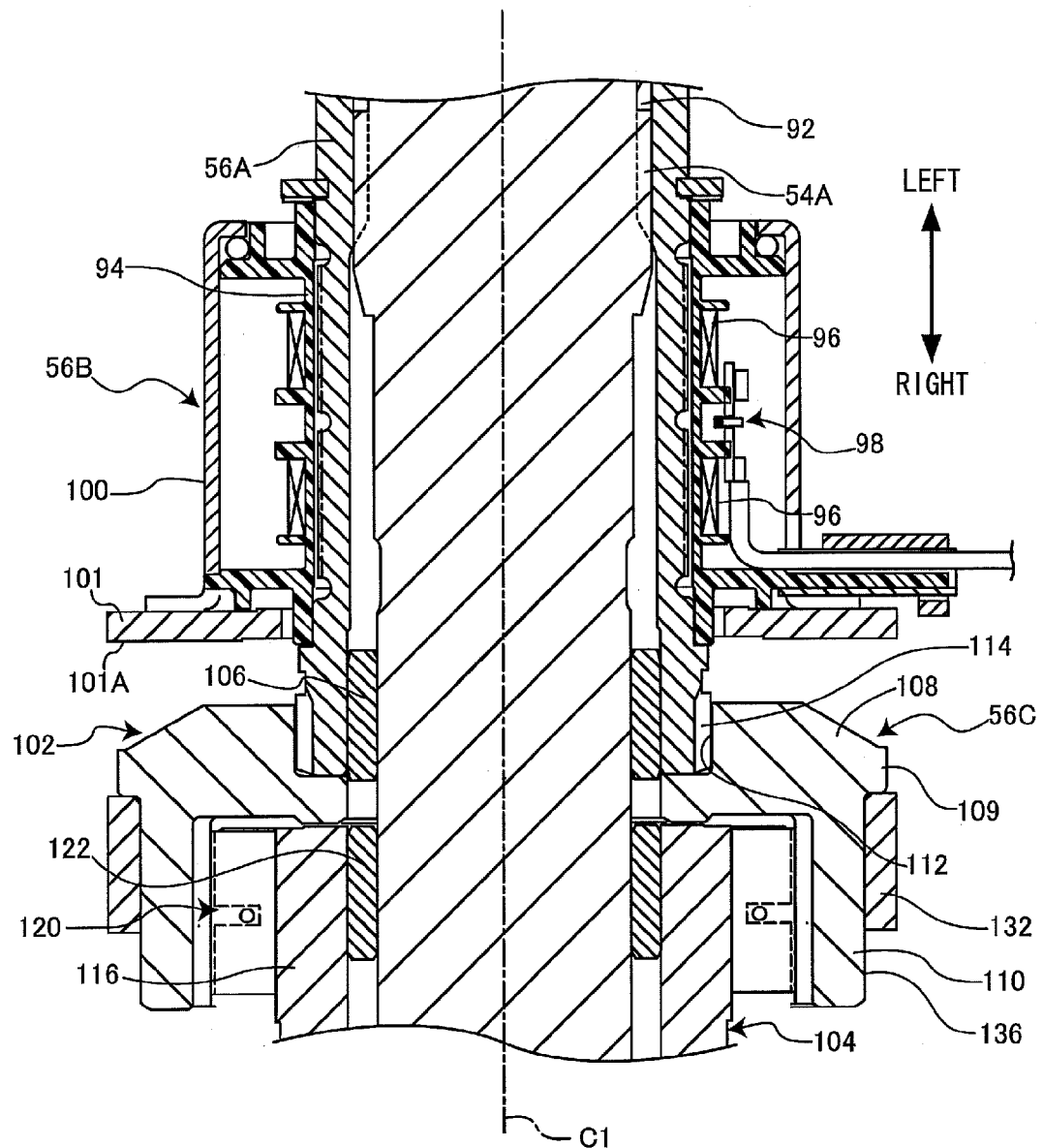
FIG. 6 is an enlarged cross-sectional view of portions of components shown in FIG. 5.

Next, the rotating member 56 will be described with reference to FIGS. 4 to 6. FIG. 4 is a side view of the rotating member 56 with the crankshaft 54 inserted therethrough. FIG. 5 is a cross-sectional view of the rotating member 56 with the crankshaft 54 inserted therethrough. FIG. 6 is an enlarged cross-sectional view of portions of components shown in FIG. 5.

As shown in FIGS. 4 and 5, the rotating member 56 is positioned to be concentric with the crankshaft 54 and rotates together with the crankshaft 54. The rotating member 56 includes a connecting shaft 56A, a torque detection device 56B, and a one-way clutch 56C.

The connecting shaft 56A is located at one of the ends of the rotating member 56 disposed along its axis (i.e., to the left) and is located inside the housing 52 (see FIG. 3). As shown in FIG. 5, the connecting shaft 56A has the shape of a circular or substantially circular cylinder. The crankshaft 54 is inserted through the connecting shaft 56A. The connecting shaft 56A is positioned to be concentric with the crankshaft 54.

As shown in FIGS. 5 and 6, serrations 92 are provided on the inner peripheral surface of one of the ends of the connecting shaft 56A disposed along its axis. The serrations 92 engage serrations 54A provided on the outer peripheral surface of the crankshaft 54. Thus, the connecting shaft 56A is coupled with the crankshaft 54. As such, the connecting shaft 56A rotates together with the crankshaft 54 regardless of whether the crankshaft 54 rotates forward or rearward. A slide bearing 106 is located between the other one of the ends of the connecting shaft 56A disposed along its axis and the crankshaft 54.

As shown in FIG. 3, the torque detection device 56B is located inside the housing 52 and arranged to detect the torque generated by the crankshaft 54 when the rider operates the pedals 36R and 36L (see FIG. 1). The torque detection device 56B is provided on the connecting shaft 56A. The torque detection device 56B is preferably a magnetostrictive torque sensor. As shown in FIGS. 5 and 6, the torque detection device 56B includes an attachment shaft 94, a coil 96, a detector 98, and a shield 100.

As shown in FIGS. 5 and 6, the attachment shaft 94 is attached to the outer peripheral surface of the connecting shaft 56A and rotates relative to the connecting shaft 56A. In other words, the attachment shaft 94 does not rotate together with the connecting shaft 56A. The coil 96 is located on the outer peripheral surface of the attachment shaft 94. The detector 98 detects the torque generated in the crankshaft 54 by detecting changes in the voltage across the coil 96 caused by distortions of the connecting shaft 56A. The detector 98 outputs the detected torque to a control device (not shown). The control device refers to the torque output by the detector 98 to monitor the pedaling effort of the rider and control the electric motor 60A. The shield 100 prevents the detection precision of the detector 98 from being reduced by external magnetic fields. The shield 100 is attached to a support plate 101. The support plate 101 includes a lower surface 101A that extends in directions perpendicular or substantially perpendicular to an axial direction of the crankshaft 54. The support plate 101 engages an engagement piece (not shown) provided on the first housing portion 52A. That is, the shield 100 does not rotate together with the connecting shaft 56A.

As shown in FIGS. 5 and 6, the one-way clutch 56C is located closer to the driving sprocket 58 than the torque detection device 56B is, and is positioned to be concentric with the crankshaft 54. The one-way clutch 56C includes a driving member 102 and a driven member 104. The driving member 102 includes a body 108 and a cylindrical portion 110.

As shown in FIGS. 5 and 6, the body 108 has a ring shape. The crankshaft 54 is inserted through the body 108. The body 108 is positioned to be concentric with the crankshaft 54.

As shown in FIGS. 5 and 6, serrations 112 are provided on the inner peripheral surface of the body 108. The serrations 112 engage serrations 114 provided on the outer peripheral surface of the other one of the ends of the connecting shaft 56A disposed along its axis. Thus, the body 108, i.e., the driving member 102 is coupled with the connecting shaft 56A. As such, the body 108, i.e., the driving member 102 rotates together with the connecting shaft 56A regardless of whether the connecting shaft 56A rotates forward or rearward. In other words, the driving member 102 rotates together with the crankshaft 54 regardless of whether the crankshaft 54 rotates forward or rearward.

As shown in FIGS. 5 and 6, the cylindrical portion 110 is located closer to the driving sprocket 58 than the body 108 is, and is positioned to be concentric with the body 108. The cylindrical portion 110 has the shape of a circular or substantially circular cylinder and is positioned to be concentric with the crankshaft 54. The cylindrical portion 110 is preferably integral with the body 108.

As shown in FIGS. 5 and 6, the driven member 104 has the shape of a circular or substantially circular cylinder. The crankshaft 54 is inserted through the driven member 104. The driven member 104 is positioned to be concentric with the crankshaft 54 and is positioned to be concentric with the driving member 102.

As shown in FIG. 5, slide bearings 122 and 124 are located between the driven member 104 and crankshaft 54. Thus, the driven member 104 is rotatable relative to the crankshaft 54. A seal lip 126 is located between the driven member 104 and crankshaft 54 and closer to the other one of the ends of the rotating member disposed along its axis than the slide bearing 124 is.

As shown in FIG. 5, the driven member 104 includes a driven shaft 116 and an output shaft 118. The driven shaft 116 is located closer to the driving member 102 than the output shaft 118 is, and is positioned to be concentric with the output shaft 118. The driven shaft 116 is preferably integral with the output shaft 118.

As shown in FIGS. 5 and 6, the driven shaft 116 is located inward of the cylindrical portion 110 as measured in a direction perpendicular to the central axis C1 of the crankshaft 54. A latch mechanism 120 is located between the driven shaft 116 and cylindrical portion 110. As such, the forward rotational force of the driving member 102 can be transferred to the driven shaft 116, i.e., the driven member 104, while the rearward rotational force of the driving member 102 cannot be transferred to the driven shaft 116, i.e., the driven member 104.

As shown in FIG. 5, the output shaft 118 is rotationally supported by the second bearing 68R. The output shaft 118 includes portions located adjacent to the side of the second bearing 68R opposite the side thereof adjacent the driving member 102. The driving sprocket 58 is attached to these portions (see FIG. 3).

That is, the one-way clutch 56C allows a rotational force that causes forward rotation of the driving sprocket 58 about the central axis C1 of the crankshaft 54 to be transferred to the driving sprocket 58, while it prevents a rotational force that causes rearward rotation of the driving sprocket 58 to be transferred to the driving sprocket 58.

Next, the rotation detection device 130 will be described with reference to FIG. 3. The rotation detection device 130 is located inside the housing 52 and detects rotation of the crankshaft 54. The rotation detection device 130 includes a ring magnet 132 that serves as the detected portion, and a detector 134.

The ring magnet 132 has the shape of a circular or substantially circular cylinder. The ring magnet 132 may be a ferrite bonded magnet, for example. The outer peripheral surface of the ring magnet 132 defines magnetic poles. More specifically, the peripheral surface of the ring magnet 132 has alternating north and south poles around the central axis C1 of the crankshaft 54. The number of magnetic poles of the ring magnet 132 may be in the range of about 32 to about 44, for example. The magnetization pitch of the ring magnet 132 may be in the range of about 3.5 to about 4.8 mm, for example.

The ring magnet 132 is provided on the rotating member 56. The ring magnet 132 is located closer to the connecting shaft 56A than the output shaft 118 is, and is located inside the housing 52 and around the central axis C1 of the crankshaft 54.

The ring magnet 132 is provided on the driving member 102. More particularly, in the present preferred embodiment, the ring magnet 132 is provided on the cylindrical portion 110. This will be illustrated in more detail below.

As shown in FIGS. 4 to 6, the driving member 102 includes an attachment surface 136. The attachment surface 136 is located closer to the connecting shaft 56A than the output shaft 118 is, and is located inside the housing 52 and around the central axis C1 of the crankshaft 54. In the present preferred embodiment, the attachment surface 136 is the outer peripheral surface of the driving member 102, and includes the outer peripheral surface of the body 108 and that of the cylindrical portion 110. In other words, the attachment surface 136 is a cylindrical surface extending in an axial direction of the crankshaft 54.

The driving member 102 is inserted through the ring magnet 132, and the inner peripheral surface of the ring magnet 132 is bonded to the outer peripheral surface (i.e., the attachment surface 136) of the driving member 102. Thus, the ring magnet 132 is attached to the attachment surface 136.

The attachment surface 136 includes the outer peripheral surface of the cylindrical portion 110. As the ring magnet 132 is attached to the outer peripheral surface of the cylindrical portion 110, the ring magnet 132 is provided on the cylindrical portion 110.

As shown in FIGS. 5 and 6, the driving member 102 includes a projection 109. The projection 109 protrudes outward from the attachment surface 136 as measured in a direction perpendicular to the central axis C1 of the crankshaft 54. When the ring magnet 132 is attached to the attachment surface 136 in the manner described above, the ring magnet 132 is in contact with the projection 109 such that the magnet and projection are arranged in an axial direction of the crankshaft 54. As will be apparent from this arrangement, in the present preferred embodiment, the driving member 102 is inserted into the ring magnet 132 starting from the cylindrical portion 110.

As the ring magnet 132 is attached to the attachment surface 136 in the manner described above, the ring magnet 132 is located closer to the second bearing 68R than the middle point LC of the distance L1 between the first and second bearings 68L and 68R is, as shown in FIG. 4. In other words, the ring magnet 132 is provided on the rotating member 56 closer to the second bearing 68R than to the first bearing 68L.

As the ring magnet 132 is attached to the attachment surface 136 in the manner described above, at least portions of the ring magnet 132 are located closer to the second bearing 68R than the overlay surfaces 53A and 53B of the first and second housing portions 52A and 52B are, as shown in FIG. 3.

As the ring magnet 132 is attached to the attachment surface 136 in the manner described above, the ring magnet 132 is located closer to the overlay surfaces 53A and 53B than to the second bearing 68R, as measured in an axial direction of the crankshaft 54, as shown in FIG. 3.

The detector 134 detects the rotation of the ring magnet 132 together with the rotation member 56. In the present preferred embodiment, the detector 134 detects changes in the magnetic field caused by the rotation of the ring magnet 132 together with the rotating member 56. In other words, in the present preferred embodiment, the rotation detection device 130 is a magnetic rotation detection sensor.

The ring magnet 132 is provided on the driving member 102 of the rotating member 56, which rotates together with the crankshaft 54. As such, the rotation of the crankshaft 54 is detected by detecting changes in the magnetic field caused by the rotation of ring magnet 132. The detector 134 outputs the detected rotation of the crankshaft 54 to the control device (not shown). The control device refers to the rotation of the crankshaft 54 detected by the detector 134, in addition to the torque detected by the detector 98, to monitor the pedaling effort by the rider and to control the electric motor 60A.

The detector 134 is preferably a one-chip hole IC that includes two detecting elements. Thus, the detector detects the transverse and longitudinal fields of the ring magnet 132. As such, the detector determines whether the ring magnet 132 is rotating forward or rearward.

The detector 134 is provided on a substrate 138 such that both the detector 134 and the substrate 138 are located completely inside the housing 52. The substrate 138 is separate from the substrate on which the control device that controls the electric motor 60A is mounted. The substrate 138 is attached to the first housing portion 52A. Then, the detector 134 is positioned outward of the ring magnet 132 as measured in a direction perpendicular to the central axis C1 of the crankshaft 54. The detector 134 faces the surface of the ring magnet 132 that defines the magnetic poles (i.e., the outer peripheral surface) such that the detector and magnet are arranged in a direction perpendicular or substantially perpendicular to the central axis C1 of the crankshaft 54.

In the electric assist bicycle 10, the rider operates the pedals 36L and 36R such that the crankshaft 54 rotates forward. As the crankshaft 54 rotates forward, the connecting shaft 56A rotates forward. As the connecting shaft 56A rotates forward, the driving member 102 rotates forward. As the driving member 102 rotates forward, the driven member 104 rotates forward. When the driving member 102 rotates rearward, i.e., when the crankshaft 54 rotates rearward, the driving member 102 rotates relative to the driven member 104. As the driven member 104 rotates forward, the driving sprocket 58 rotates forward. The rotational force of the driving sprocket 58 is transferred to the driven sprocket 26 via the chain 30.

As the rider operates the pedals 36L and 36R, a torque is generated in the crankshaft 54. The torque generated in the crankshaft 54 is detected by the torque detection device 56B. When the torque generated in the crankshaft 54 continues to be above a predetermined reference value for a certain period of time or longer, the rotor 72 of the electric motor 60A, i.e., the rotating shaft 74, rotates forward. As the rotating shaft 74 rotates forward, the output gear 82 rotates rearward. As the output gear 82 rotates rearward, the output shaft 80 rotates rearward. As the output shaft 80 rotates rearward, the auxiliary sprocket 62 rotates rearward. The rotational force of the auxiliary sprocket 62 is transferred to the driven sprocket 26 via the chain 30. Thus, the rider is assisted in pedaling.

In the electric assist bicycle 10, the rotation detection device 130 detects the rotation of the crankshaft 54. This makes it possible to refer to the rotation of the crankshaft 54, in addition to the torque generated in the crankshaft 54, to monitor the pedaling effort by the rider. As a result, the pedaling effort by the rider is monitored more accurately, making it easier to detect a failure or making it possible to assist the rider more appropriately, for example.

The electric assist bicycle 10 includes a driving unit 50. The driving unit 50 includes a housing 52, a crankshaft 54, a torque detection device 56B, a rotating member 56, and a rotation detection device 130.

The crankshaft 54 is positioned to extend through the housing 52. The torque detection device 56B is located in the housing 52 to detect a torque generated in the crankshaft 54. The rotating member 56 includes the torque detection device 56B, and is positioned to be concentric with the crankshaft 54 and rotates together with the crankshaft 54. The rotation detection device 130 is located in the housing 52 and detects rotation of the crankshaft 54.

The rotating member 56 includes a connecting shaft 56A and an output shaft 118. The connecting shaft 56A is located at one of ends of the rotating member 56 disposed along its axis, and is coupled with the crankshaft 54 within the housing 52. The output shaft 118 is located at the other one of the ends of the rotating member 56 disposed along its axis, and a driving sprocket 58 is attached to the output shaft.

The rotation detection device 130 includes a detected portion (ring magnet 132) and a detector 134. The ring magnet 132 is provided on the rotating member 56 and located around a central axis of the crankshaft 54 within the housing 52. The detector 134 detects that the ring magnet 132 rotates together with the rotation member 56. The ring magnet 132 is provided in a position different from that of the torque detection device 56B as measured in an axial direction of the crankshaft 54.

In the above arrangement, the ring magnet 132 is provided on the rotating member 56. Thus, a ring magnet 132 with larger inner and outer diameters is provided than in implementations where a ring magnet 132 is directly attached to the outer peripheral surface of the crankshaft 54. This results in a ring magnet 132 with a large number of magnetic poles. A ring magnet 132 with a large number of magnetic poles results in the detector 134 providing improved precision in detecting the rotation of the crankshaft 54, i.e., improved detection resolution of the detector 134. This makes it easier to monitor the pedaling effort by the rider.

Further, in implementations where a ring magnet 132 is directly attached to the outer peripheral surface of the crankshaft 54, the crankshaft 54 must be longer in an axial direction to ensure an area of the crankshaft 54 to which the ring magnet 132 is to be attached. In the above arrangement, the ring magnet 132 is provided on the rotating member 56, thus making it unnecessary to ensure an area of the crankshaft 54 to which the ring magnet 132 is to be attached. As such, the axial dimension of the crankshaft 54 is smaller than in implementations where a ring magnet 132 is directly attached to the outer peripheral surface of the crankshaft 54.

The rotating member 56 may further include a one-way clutch 56C. The one-way clutch 56C may be located closer to the driving sprocket 58 than the torque detection device 56B is. The one-way clutch 56C may transfer a rotational force that causes rotation of the driving sprocket 58 in one direction (i.e., the forward direction) around the central axis C1 of the crankshaft 54 to the driving sprocket 58, and prevent a rotational force that causes rotation of the driving sprocket 58 in a direction opposite to the forward direction (i.e., the reverse direction) from being transferred to the driving sprocket 58. The torque detection device 56B may be attached to the connecting shaft 56A. The one-way clutch 56C may include a driving member 102 that rotates together with the crankshaft 54. The detected portion (i.e., the ring magnet 132) may be provided on one of the driving member 102 and connecting shaft 56A. In other words, the detected portion (i.e., the ring magnet 132) may be attached to a member that rotates together with the crankshaft 54.

In the above arrangement, the ring magnet 132 has large inner and outer diameters such that the ring magnet 132 has a large number of magnetic poles. This improves the detection resolution of the detector 134.

The detected portion (i.e., the ring magnet 132) may be provided on the driving member 102. In this case, the ring magnet 132 is located closer to the driving sprocket 58 than the torque detection device 56B is. One of the spaces defined by the housing 52 and the plane including the torque detection device 56B that is closer to the driving sprocket 58 is larger than the other one. This is because the output shaft 118 must be included. Thus, the ring magnet 132 may have large inner and outer diameters such that the ring magnet 132 has a large number of magnetic poles. This improves the detection resolution of the detector 134.

The one-way clutch 56C may further include a driven member 104. The driven member 104 may be located inward of the driving member 102 as measured in a direction perpendicular to the central axis C1 of the crankshaft 54. The driving member 102 may include a cylindrical portion 110 located outward of the driven member 104 as measured in a direction perpendicular to the central axis C1 of the crankshaft 54. At least a portion of the detected portion (i.e., the ring magnet 132) may be provided on the cylindrical portion 110.

In the above arrangement, the ring magnet 132 may have large inner and outer diameters such that the ring magnet 132 has a large number of magnetic poles. This improves the detection resolution of the detector 134.

In addition, in the above arrangement, the ring magnet 132 is located outward of the one-way clutch 56C as measured in a direction perpendicular to the central axis C1 of the crankshaft 54. In other words, the ring magnet 132 is located outward of a member that achieves a predetermined function as the crankshaft 54 rotates, as measured in a direction perpendicular to the central axis C1 of the crankshaft 54. Thus, the crankshaft 54 may have a smaller axial dimension than in implementations where the ring magnet 132 and a member that achieves a predetermined function as the crankshaft 54 rotates are arranged in an axial direction of the crankshaft 54.

The driven member 104 may include an output shaft 118 to which the driving sprocket 58 is to be attached. In this case, the ring magnet 132 may be located close to the driving sprocket 58. One of the spaces defined by the housing 52 that is close to the driving sprocket 58 is larger than the one of the spaces that is far from the driving sprocket 58. Thus, the ring magnet 132 may have large inner and outer diameters such that the ring magnet 132 may have a large number magnet poles. This improves the detection resolution of the detector 134.

The driving unit 50 may further include a first bearing 68L and a second bearing 68R. The first bearing 68L may be located at one of the ends of the crankshaft 54 disposed along its axis, and rotatably supports the crankshaft 54. The second bearing 68R may be located at the other one of the ends of the crankshaft 54 disposed along its axis, and rotatably support the rotating member 54 (i.e., the output shaft 118). The detected portion (i.e., the ring magnet 132) may be provided on the rotating member 56, located closer to the second bearing 68R than to the first bearing 68L.

In this case, the inner diameter of the second bearing 68R is larger than the inner diameter of the first bearing 68L. Thus, the one of the spaces defined by the housing 52 that is close to the second bearing 68R is larger than the one of the spaces close to the first bearing 68L. As such, the ring magnet 132 may have large inner and outer diameters such that the ring magnet 132 has a large number of magnetic poles, thus improving the detection resolution of the detector 134.

The outer diameter of the ring magnet 132 is smaller than the outer diameter of the second bearing 68R (see FIG. 3). If the outer diameter of the ring magnet 132 were larger than the outer diameter of the second bearing 68R, the ring magnet 132 could contact other members in the second housing portion 52B when the second bearing 68R is joined to the second housing portion 52B. In contrast, as the ring magnet 132 is smaller than the outer diameter of the second bearing 68R, the ring magnet 132 is prevented from contacting other members in the second housing portion 52B when the second bearing 68R is joined to the second housing portion 52B.

The outer diameter of the second bearing 68R is larger than the outer diameter of the first bearing 68L. Thus, a ring magnet 132 with a large diameter may be provided if the ring magnet 132 is located close to the second bearing 68R than in implementations where the ring magnet 132 is located close to the first bearing 68L.

The driving unit 50 may further include a first bearing 68L and a second bearing 68R. The first bearing 68L may be located at one of the ends of the crankshaft 54 disposed along its axis, and rotatably support the crankshaft 54. The second bearing 68R may be located at the other one of the ends of the crankshaft 54 disposed along its axis, and rotatably support the rotating member 56. The outer diameter of the second bearing 68R may be larger than the outer diameter of the first bearing 68L.

The detected portion (i.e., the ring magnet 132) is provided on the rotating member 56 which is supported by the second bearing 68R which has a larger diameter than the first bearing 68L. Thus, the large space near the second bearing 68R may be taken advantage of, and a ring magnet 132 with a large diameter may be provided. This improves the detection resolution.

The housing 52 may include a first housing portion 52A and a second housing portion 52B that are overlaid so as to be arranged in an axial direction of the crankshaft 54. The second bearing 68R may be supported by the second housing portion 52B. At least a portion of the detected portion (i.e., the ring magnet 132) may be located closer to the second housing portion 52B than the overlay surfaces 53A and 53B of the first and second housing portions 52A and 52B are (see FIG. 3).

In this case, the ring magnet 132 may be positioned in a large space near the second bearing 68R. Thus, the ring magnet 132 may have a large diameter. This improves the detection resolution.

The detected portion (i.e., the ring magnet 132) may be located closer to the overlay surfaces 53A and 53B than to the second bearing 68R as measured in an axial direction of the crankshaft 54 (see FIG. 3).

In this case, the ring magnet 132 is positioned in a large space near the second bearing 68R. Thus, the ring magnet 132 may have a large diameter. This improves the detection resolution.

The second housing portion 52B may be made by casting (in the present preferred embodiment, preferably by die-casting), for example. In view of this, a slope 55B is provided at a portion of the second housing portion 52B near a portion thereof that supports the second bearing 68R. As such, the space becomes larger as it extends toward the overlay surface 53B in the second housing portion 52B. Since the ring magnet 132 may be located in a large space, the ring magnet 132 may have a large diameter. This improves the detection resolution.

The rotating member 56 may further include an attachment surface 136. The attachment surface 136 may be located closer to the connecting shaft 56A than the output shaft 118 is and around the central axis C1 of the crankshaft 54 in the housing 52. The detected portion (i.e., the ring magnet 132) may be attached to the attachment surface 136.

In this case, the ring magnet 132 may be fabricated separately from the rotating member 56. This makes it easier to adjust the positional relationship between the ring magnet 132 and detector 134 in the housing 52.

The attachment surface 136 may be a cylindrical or substantially cylindrical surface extending in an axial direction of the crankshaft 54. In this case, the detector 134 may be positioned opposite to the surface of the ring magnet 132 that defines the magnetic poles such that the detector and the surface are arranged in a direction perpendicular or substantially perpendicular to the central axis C1 of the crankshaft 54.

The rotating member 56 may further include a projection 109. The projection 109 may protrude outward from the attachment surface 136 as measured in a direction perpendicular to the central axis C1 of the crankshaft 54. The ring magnet 132 may contact the projection 109 such that the magnet and projection are arranged in an axial direction of the crankshaft 54 when the detected portion (i.e., the ring magnet 132) is attached to the attachment surface 136.

In this case, a relative positional relationship between the ring magnet 132 and driving member 102 in an axial direction of the crankshaft 54 may be defined. This improves the efficiency in joining the ring magnet 132 to the driving member 102.

Second Preferred Embodiment

Figure 7:
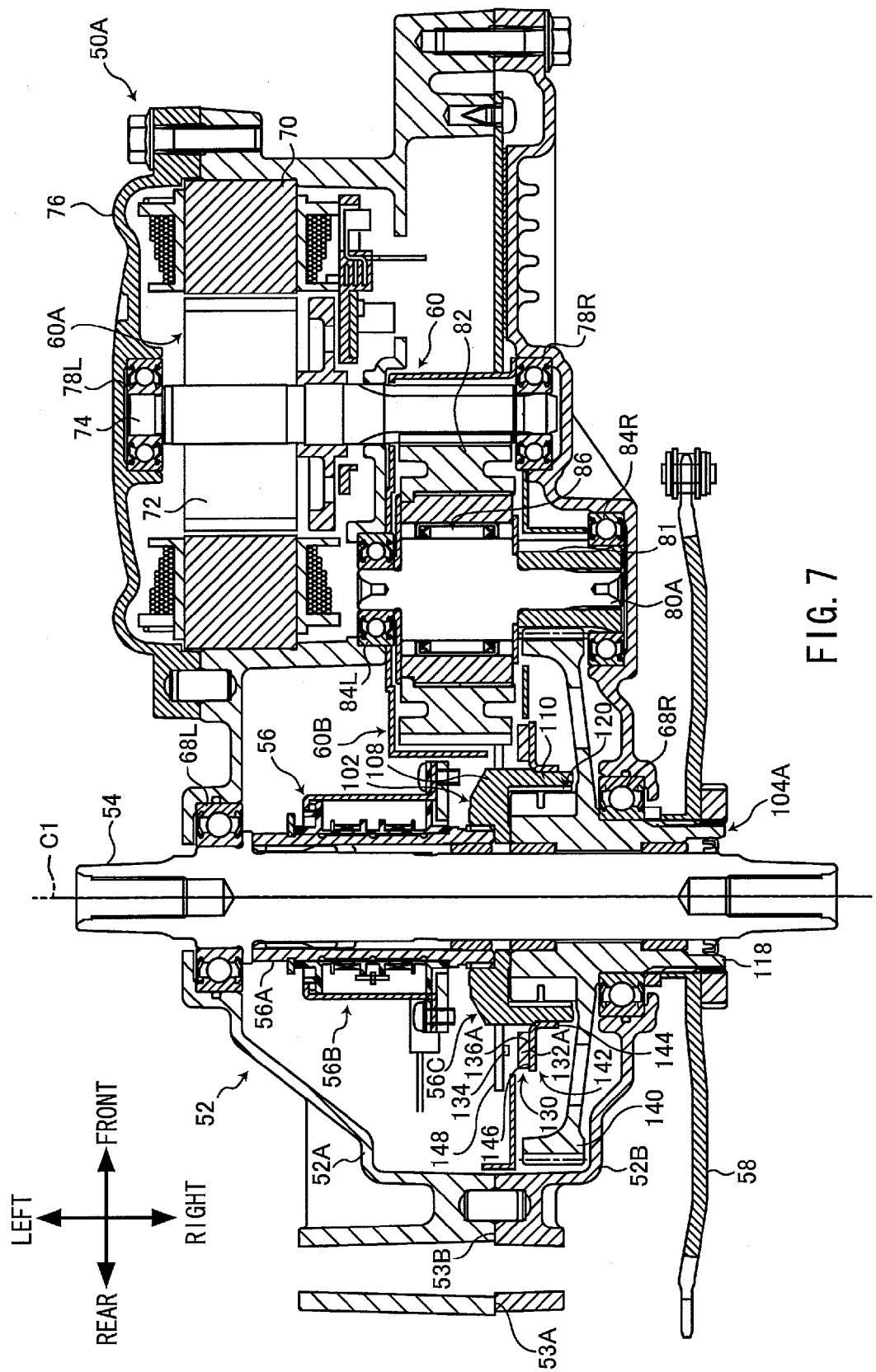
FIG. 7 is a cross-sectional view of a driving unit included in an electric assist bicycle according to a second preferred embodiment of the present invention.
Figure 8:
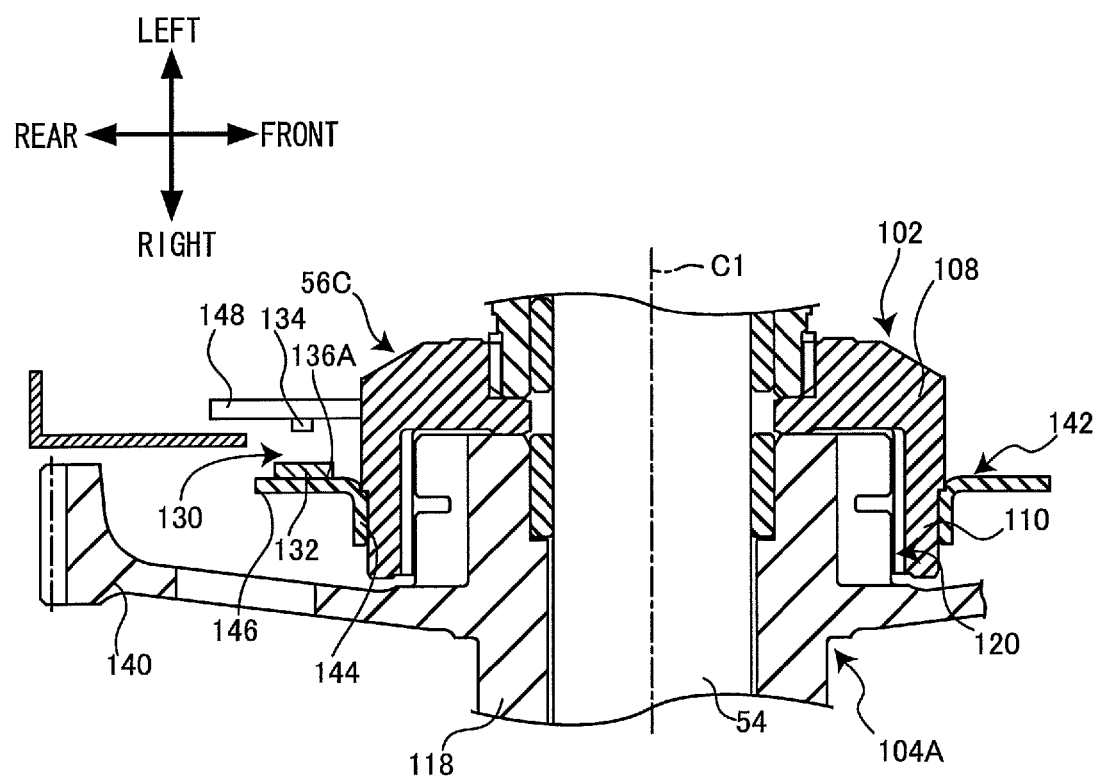
FIG. 8 is an enlarged cross-sectional view of portions of components shown in FIG. 7.

Next, a second preferred embodiment of the present invention will be described with reference to FIGS. 7 and 8. FIG. 7 is a cross-sectional view of a driving unit 50A included in an electric assist bicycle of the second preferred embodiment. FIG. 8 is an enlarged cross-sectional view of portions of components shown in FIG. 7.

As shown in FIG. 7, the driving unit 50A, as compared with the driving unit 50, does not have the auxiliary sprocket 62. An output member 60B is located forward of the rotating member 56. The rotating shaft 74 is located forward of the output member 60B.

As shown in FIG. 7, the driving unit 50A includes an output shaft 80A in lieu of the output shaft 80. A gear 81 is provided on the output shaft 80A.

As shown in FIG. 7, the driving unit 50A includes a driven member 104A in lieu of the driven member 104. The driven member 104A includes an input gear 140. The input gear 140 is positioned to be concentric with the output shaft 118, and is located outward of the output shaft 118 as measured in a direction perpendicular to the central axis C1 of the crankshaft 54. The input gear 140 is provided integrally with the output shaft 118. The input gear 140 engages the gear 81.

As shown in FIGS. 7 and 8, the driving unit 50A includes a ring magnet 132A and support member 142 in lieu of the ring magnet 132. The ring magnet 132A has the shape of a circular or substantially circular plate. One of the ends of the ring magnet 132A disposed along its axis defines the magnetic poles. In other words, one of the ends of the ring magnet 132A disposed along its axis has alternating north and south poles around the central axis C1 of the crankshaft 54.

As shown in FIGS. 7 and 8, the support member 142 includes a cylindrical portion 144 and a circular ring 146. The cylindrical portion 144 extends in an axial direction of the crankshaft 54. The cylindrical portion 144 is fixed to the outer peripheral surface of the cylindrical portion 110. The cylindrical portion 144 may be fixed to the outer peripheral surface of the cylindrical portion 110 by press fitting or bonding, for example.

As shown in FIGS. 7 and 8, the circular ring 146 is located at one of the ends of the cylindrical portion 144 disposed in an axial direction and is positioned to be concentric with the cylindrical portion 144. The circular ring 146 is preferably integral with the cylindrical portion 144. The circular ring 146 includes an attachment surface 136A. The attachment surface 136A is one of the sides of the circular ring 146 disposed along its axis and is an annular surface extending in directions perpendicular or substantially perpendicular to the central axis C1 of the crankshaft 54. The attachment surface 136A is a plane parallel or substantially parallel to one of the sides of the substrate 148 disposed in a thickness direction thereof.

In the present preferred embodiment, as the support member 142 is attached to the driving member 102, the rotating member 56 includes the attachment surface 136A.

As shown in FIGS. 7 and 8, in the driving unit 50, the circular ring 146 and ring magnet 132A are overlaid so as to be arranged in an axial direction of the crankshaft 54. Then, one of the sides of the ring magnet 132A disposed along its axis is bonded to the attachment surface 136A.

As shown in FIGS. 7 and 8, in the driving unit 50A, the detector 134 is located on the substrate 148. A control device (not shown) that controls the electric motor 60A is mounted on the substrate 148. In other words, in the present preferred embodiment, a separate substrate on which the detector 134 is to be positioned, other than the substrate on which the control device is mounted, need not be provided.

In this electric assist bicycle, the rider operates the pedals 36L and 36R such that the crankshaft 54 rotates forward. As the crankshaft 54 rotates forward, the connecting shaft 56A rotates forward. As the connecting shaft 56A rotates forward, the driving member 102 rotates forward. As the driving member 102 rotates forward, the driven member 104 rotates forward. When the driving member 102 rotates rearward, i.e., when the crankshaft 54 rotates rearward, the driving member 102 rotates relative to the driven member 104. As the driven member 104 rotates forward, the driving sprocket 58 rotates forward. The rotational force of the driving sprocket 58 is transferred to the driven sprocket 26 via the chain 30.

As the rider operates the pedals 36L and 36R, a torque is generated in the crankshaft 54. The torque generated in the crankshaft 54 is detected by the torque detection device 56B. When the torque generated in the crankshaft 54 continues to be above a predetermined reference torque for a certain period of time or longer, the rotor 72 of the electric motor 60A, i.e., the rotational shaft 74, rotates forward. When the rotational shaft 74 rotates forward, the output gear 82 rotates rearward. As the output gear 82 rotates rearward, the output shaft 80 rotates rearward. As the output shaft 80 rotates rearward, the input gear 140 rotates forward. As the input gear 140 rotates forward, the driving sprocket 58 rotates forward. Thus, the rider is assisted in pedaling.

In the electric assist bicycle including the driving unit 50 described above, the rotating member 56 may include an annular surface. The annular surface may extend in directions perpendicular or substantially perpendicular to the axis of the crankshaft 54. The annular surface may provide the attachment surface 136A.

In this case, the detector 134 may be located opposite to the surface of the ring magnet 132 that defines the electric poles such that the detector and magnet are arranged in an axial direction of the crankshaft 54.

Further, in the present preferred embodiment, an input gear 140 is provided. This makes it easier to ensure a large space inside the second housing portion 52B and near the second bearing 68R. As such, the ring magnet 132 may have a large diameter, thus improving the detection resolution.

Particularly, in the present preferred embodiment, the input gear 140 is larger than the outer diameter of the second bearing 68R. This makes it still easier to ensure a large space inside the second housing portion 52B and near the second bearing 68R.

Third Preferred Embodiment

Figure 9:
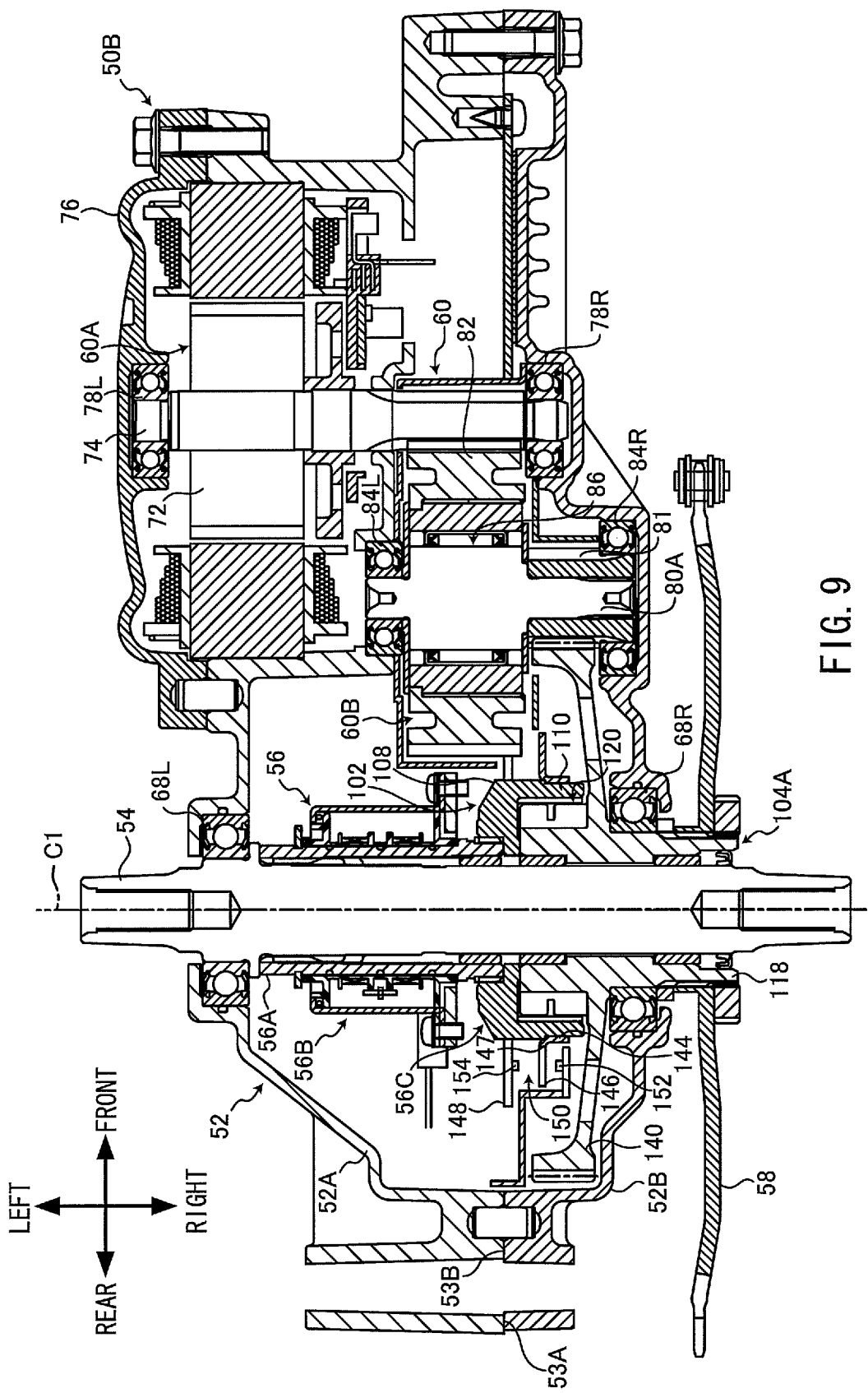
FIG. 9 is a cross-sectional view of a driving unit included in an electric assist bicycle according to a third preferred embodiment of the present invention.
Figure 10:
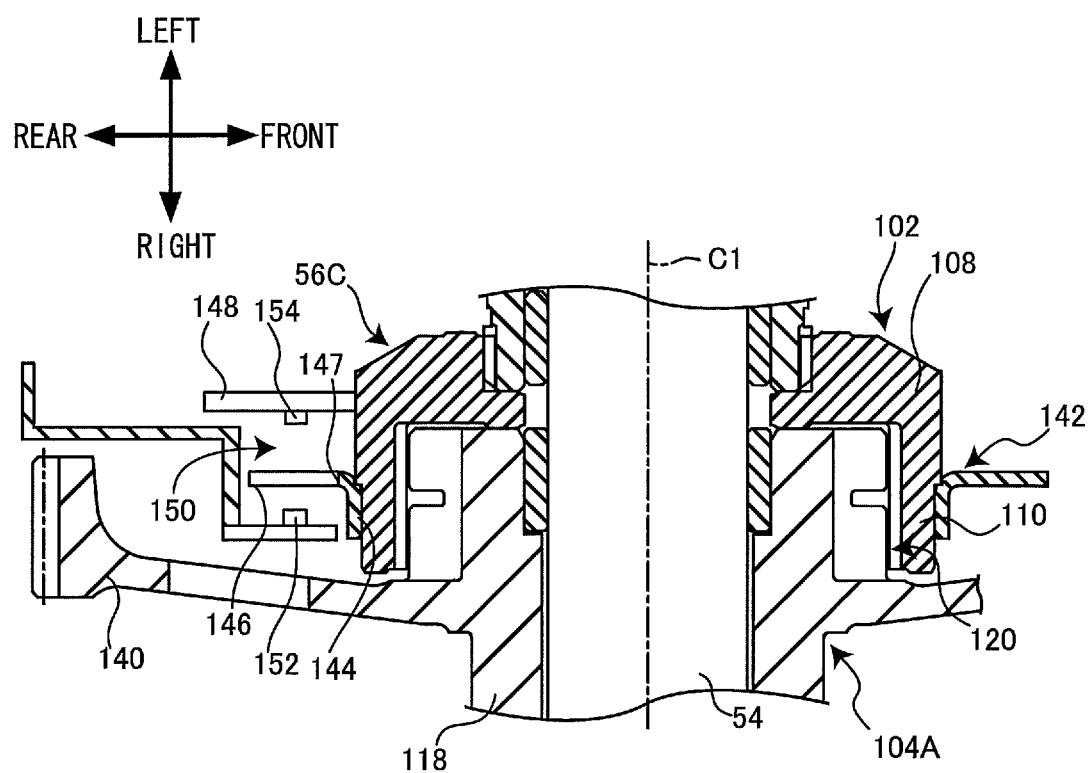
FIG. 10 is an enlarged cross-sectional view of portions of components shown in FIG. 9.

Next, a third preferred embodiment of the present invention will be described with reference to FIGS. 9 and 10. FIG. 9 is a cross-sectional view of a driving unit 50B included in an electric assist bicycle of the third preferred embodiment. FIG. 10 is an enlarged cross-sectional view of portions of components shown in FIG. 9.

As shown in FIG. 9, the driving unit 50B, as compared with the driving unit 50A of the second preferred embodiment, includes a rotation detection device 150 in lieu of the rotation detection device 130.

As shown in FIGS. 9 and 10, in the rotation detection device 150, the ring magnet 132A is not provided. Instead, a plurality of slits 147 are provided in the circular ring 146, which constitutes the annular portion. The slits 147 are provided around the central axis C1 of the crankshaft 54, with an equal distance.

As shown in FIGS. 9 and 10, in the rotation detection device 150, the detector 134 is not provided. Instead, a light emitter 152 and a light receiver 154 that serves as the detector are provided.

As shown in FIGS. 9 and 10, the light emitter 152 is located adjacent to one of the sides of the circular ring 146 disposed along the axis of the crankshaft 54. The light receiver 154 is located adjacent to the other one of the sides of the circular ring 146 disposed along the axis of the crankshaft 54.

Light emitted by the light emitter 152 is detected by the light receiver 154. As the circular ring 146 rotates, the light receiver 154 can detect light emitted by the light emitter 152 through the slits 154, whereas the light receiver 154 cannot detect light emitted by the light emitter 152 through portions of the circular ring without the slits 147. Thus, the light receiver 154 can detect the rotation of the rotating member 56. In other words, in the present preferred embodiment, the rotation detection device 150 is an optical rotation detection sensor and the circular ring 146 serves as the detected portion.

In the electric assist bicycle including the driving unit 50B described above, the rotating member 56 may further include an annular portion (i.e., the circular ring 146). The circular ring 146 may extend in a direction perpendicular or substantially perpendicular to the axis of the crankshaft 54. The circular ring 146 may serve as the detected portion.

In this manner, too, the rotation of the crankshaft 54 can be detected.

Fourth Preferred Embodiment

Figure 11:
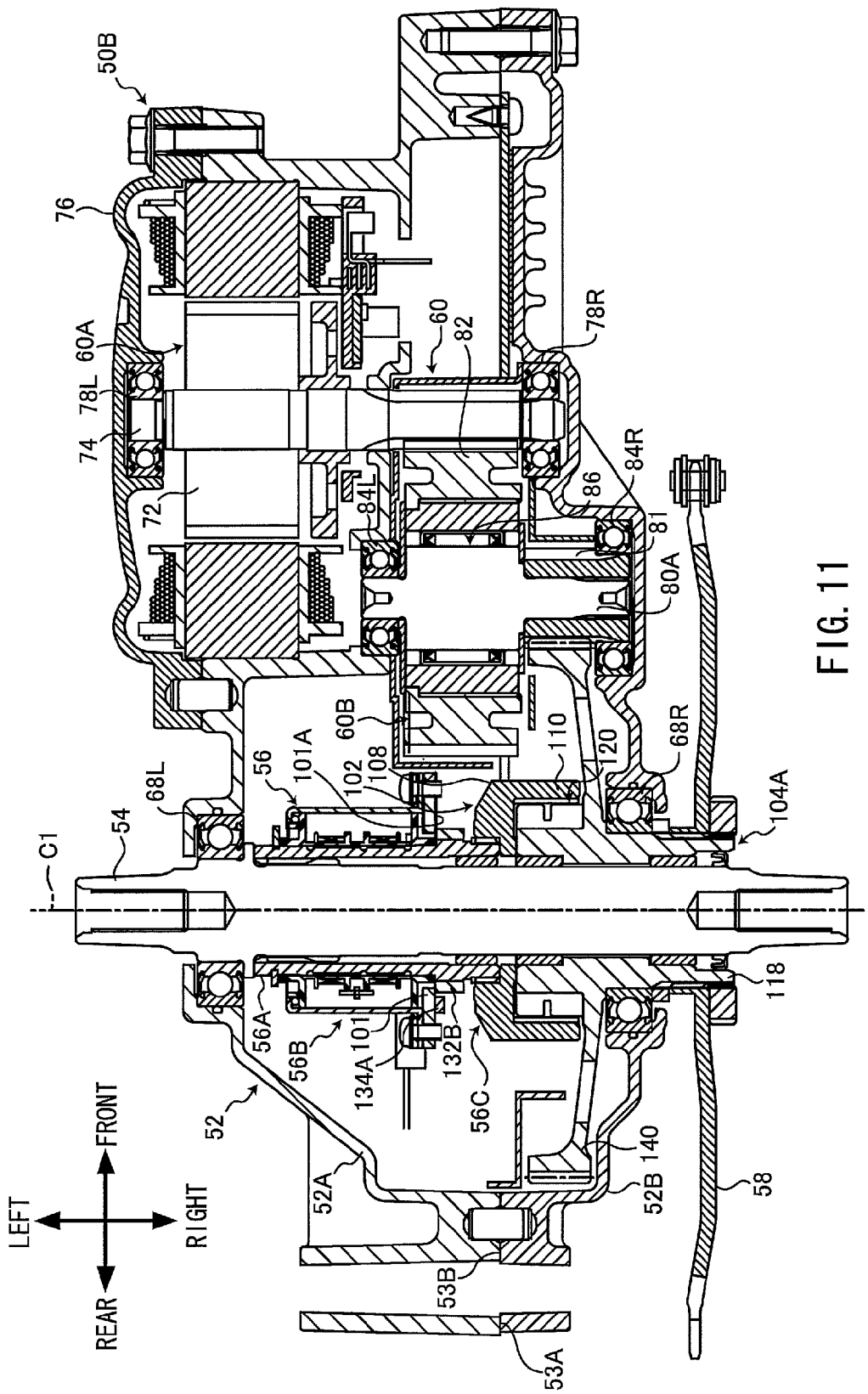
FIG. 11 is a cross-sectional view of a driving unit included in an electric assist bicycle according to a fourth preferred embodiment of the present invention.
Figure 12:
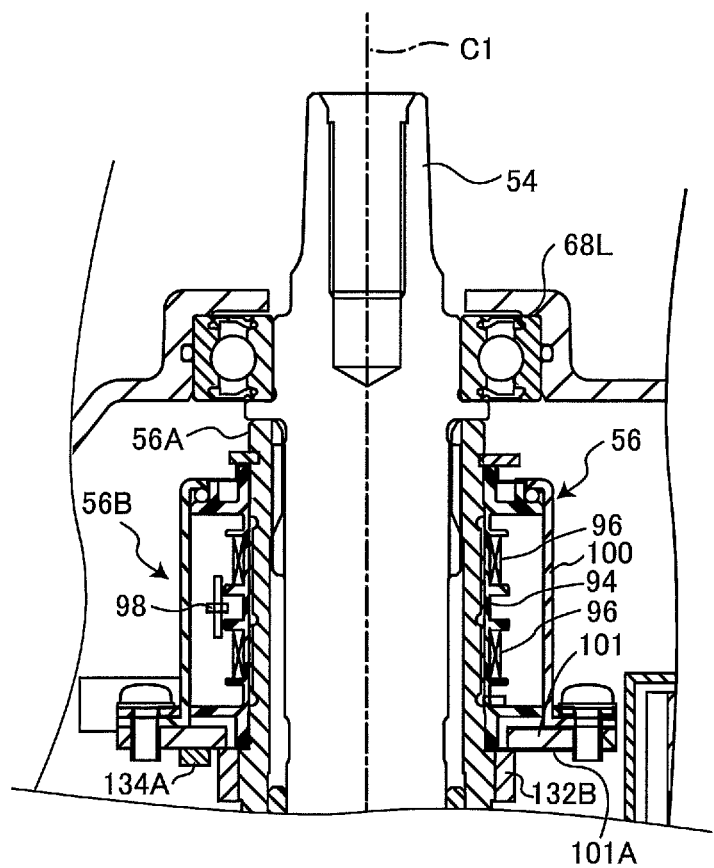
FIG. 12 is an enlarged cross-sectional view of portions of components shown in FIG. 11.

Next, a fourth preferred embodiment of the present invention will be described with reference to FIGS. 11 and 12. FIG. 11 is a cross-sectional view of a driving unit 50C included in an electric assist bicycle of the fourth preferred embodiment. FIG. 12 is an enlarged cross-sectional view of portions of components shown in FIG. 11.

As compared with the driving unit 50A, the driving unit 50C does not include a ring magnet 132A, detector 134, and support member 142. Instead, it includes a ring magnet 132B and detector 134A.

The ring magnet 132B preferably has a geometry and construction similar to those of the ring magnet 132. The ring magnet 132B is provided in a position different from that of the torque detection device 56B as measured in an axial direction of the crankshaft 54. The ring magnet 132B, together with the torque detection device 56B, is provided on the connecting shaft 56A.

At this moment, the ring magnet 132B is in contact with the outer peripheral surface of the connecting shaft 56A. That is, the ring magnet 132B is provided directly on the outer peripheral surface of the connecting shaft 56A. In other words, the ring magnet 132B is fixed to the connecting shaft 56A with no other rotatable member between itself and the connecting shaft 56A.

The ring magnet 132B is located between the torque detection device 56B and one-way clutch 56C as measured in an axial direction of the crankshaft 54. More particularly, the ring magnet 132B is located between the support plate 101 and one-way clutch 56C as measured in an axial direction of the crankshaft 54.

The detector 134A is attached to the lower surface 101A of the support plate 101. The detector 134A preferably has a construction and functions similar to those of the detector 134.

In the driving unit 50C, the ring magnet 132B is provided on the rotating member 56. Thus, a ring magnet 132B with larger inner and outer diameters may be provided than in implementations where a ring magnet 132B is directly attached to the outer peripheral surface of the crankshaft 54. This results in a ring magnet 132B with a large number of magnetic poles. A ring magnet 132B with a large number of magnetic poles results in the detector 134 providing improved precision in detecting the rotation of the crankshaft 54, i.e., improved detection resolution of the detector 134. This makes it yet easier to monitor the pedaling by the rider.

In the driving unit 50C, the ring magnet 132B is provided in a position different from that of the torque detection device 56B as measured in an axial direction of the crankshaft 54. Thus, the detection resolution of the rotation detection device 130 is improved while maintaining the precision in torque detection by the torque detection device 56B.

In the driving unit 50C, the ring magnet 132B is provided on the connecting shaft 56A. Thus, no other member is present between the ring magnet 132B and connecting shaft 56A. This facilitates positioning the ring magnet 132B precisely relative to the central axis C1 of the crankshaft 54, thus making it easier to reduce the distance between the ring magnet 132B and detector 134A.

In the driving unit 50C, the housing 52 includes a first housing portion 52A and a second housing portion 52B that are overlaid so as to be arranged in an axial direction of the crankshaft 54. The ring magnet 132B is located closer to the overlay surfaces 53A and 53B of the first and second housing portions 52A and 52B than the torque detection device 56B is.

In the housing 52, one of the spaces defined by the housing and the plane including the torque detection device 56B that is closer to the overlay surfaces 53A and 53B is larger than the other one. This is because the one-way clutch 56C must be included. Thus, the ring magnet 132B may have large inner and outer diameters such that the ring magnet 132B has a large number of magnetic poles. This improves the detection resolution of the detector 134.

In the driving unit 50C, the torque detection device 56B is preferably a magnetostrictive torque sensor. This reduces the losses of a driving force generated by the pedals compared with a planetary gear-based torque sensor. This will be described in more detail below. A planetary gear-based torque sensor uses a planetary gear train disposed concentric with the crankshaft to divide the tread force into two sub-forces. One sub-force is used directly as a driving force, while the other is used by a potentiometer located downstream along the path of transmission of forces to detect a torque. In this mechanism, the planetary gears must be driven simultaneously, requiring some additional tread force that is not to be used as a driving force. In contrast, a magnetostrictive torque sensor uses magnetostriction effects and thus detects a torque without a mechanical contact. That is, a magnetostrictive torque sensor is a non-contact torque sensor. This reduces the losses of a driving force generated by the pedals compared with a planetary gear-based torque sensor.

In the driving unit 50C, the torque detection device 56B is preferably a magnetostrictive torque sensor. This eliminates the necessity for a spring element that provides a large displacement, as can be found in a phase-detecting torque sensor, or eliminates a thinning process to provide a large distortion. Further, a special mechanism as can be found in a strain gage or planetary gear arrangement is not necessary. Since the arrangement is not complicated, a mechanical strength may be easily ensured.

In the driving unit 50C, the torque detection device 56B is preferably a magnetostrictive torque sensor. Thus, the number of components required is relatively small, thus reducing rattling of components. Further, since the device is a non-contact device, it does not wear. In addition, it has a large mechanical strength, thus reducing the hysteresis loop of distortion. This increases the reproducibility of signals in response to equal torques.

In the driving unit 50C, the torque detection device 56B is preferably a magnetostrictive torque sensor. Thus, the coil 96 is excited at a high frequency, allowing a distortion of the connecting shaft 56A to be instantly detected. That is, it provides a good responsiveness to a torque.

In the driving unit 50C, the torque detection device 56B is preferably a magnetostrictive torque sensor. Thus, a torque may be detected in a non-contact manner such that the output of the detector 98 does not change due to wear. If a potentiometer were used, a design would be required that takes wear into consideration. A planetary gear arrangement would involve large mechanical losses; in contrast, a magnetostrictive arrangement involves small mechanical losses.

In the driving unit 50, the rotational detection device 130 is preferably a magnetic rotational detection sensor. Thus, a large magnetism generated by the permanent magnet (i.e., the ring magnet 132B) is detected, making it possible to increase the gap between the detected portion (i.e., the ring magnet 132B) and the detector 134A. This facilitates positioning the detected portion (i.e., the ring magnet 132B) and the detector 134A. A rotational detection sensor that causes a high-frequency electric current to flow through a coil to detect a phase based on a change in magnetic resistance (self-excitation) would use a small magnetic field, requiring the gap between the detected portion and detector to be smaller than in a magnetic arrangement. Further, a self-exciting sensor would constantly consume an electric current, which is not the case with a magnetic sensor.

In the driving unit 50C, the rotational detection device 130 is preferably a magnetic rotational detection sensor. For example, in a rotational detection sensor that detects a phase based on an induced voltage generated by a change in magnetic resistance, a signal cannot be detected unless the number of rotations exceeds a certain level; further, as the number of rotations increases, the induced voltage increases as well, requiring a protective circuit. This is not the case with a magnetic rotational detection sensor.

In the driving unit 50C, the rotational detection device 130 is preferably a magnetic rotational detection sensor. Thus, the detector 134B may be easily located. Further, an additional detecting element may be easily located to detect transverse and longitudinal magnetic fields of the ring magnet 132B.

Fifth Preferred Embodiment

Figure 13:
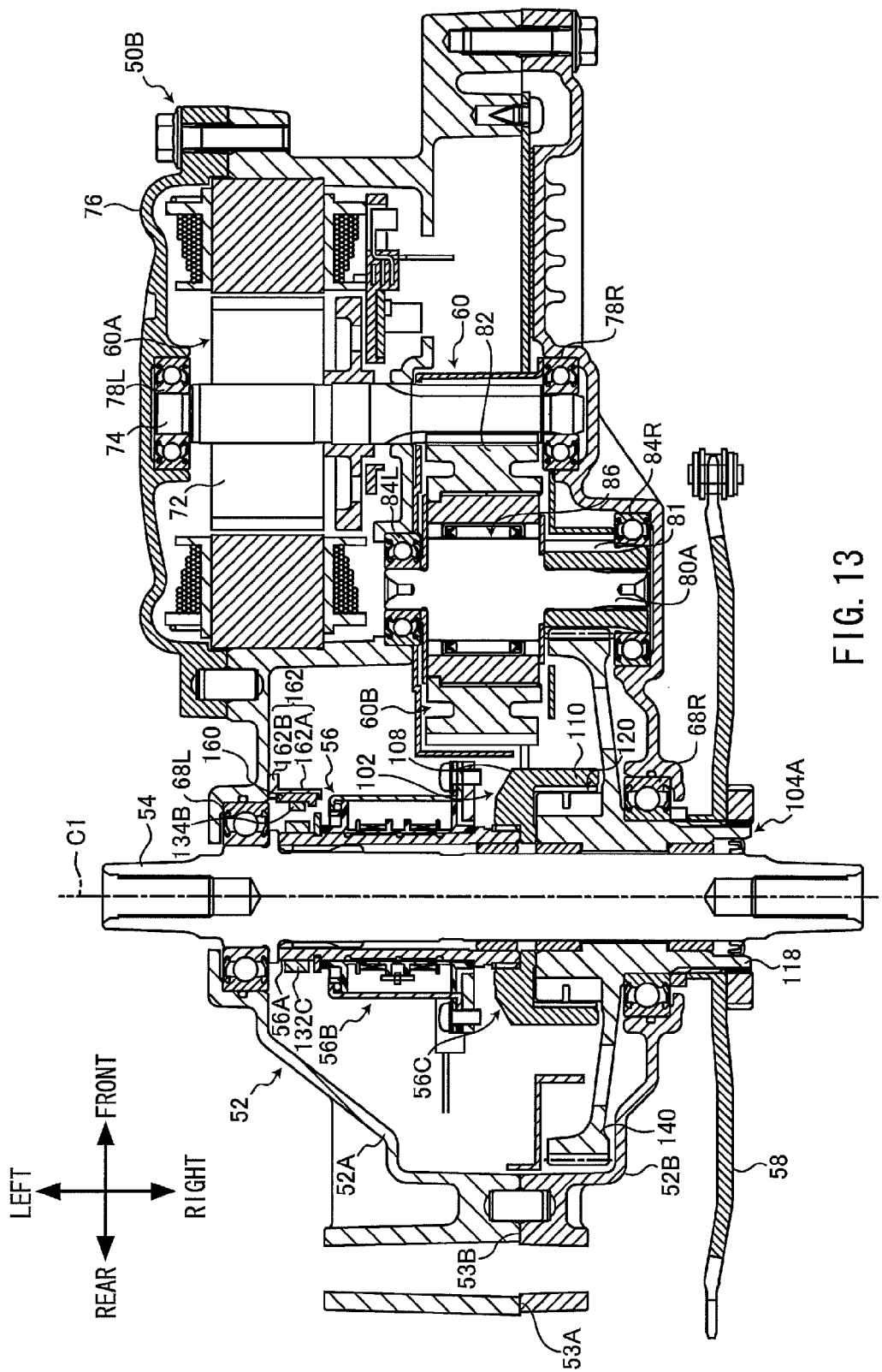
FIG. 13 is a cross-sectional view of a driving unit included in an electric assist bicycle according to a fifth preferred embodiment of the present invention.
Figure 14:
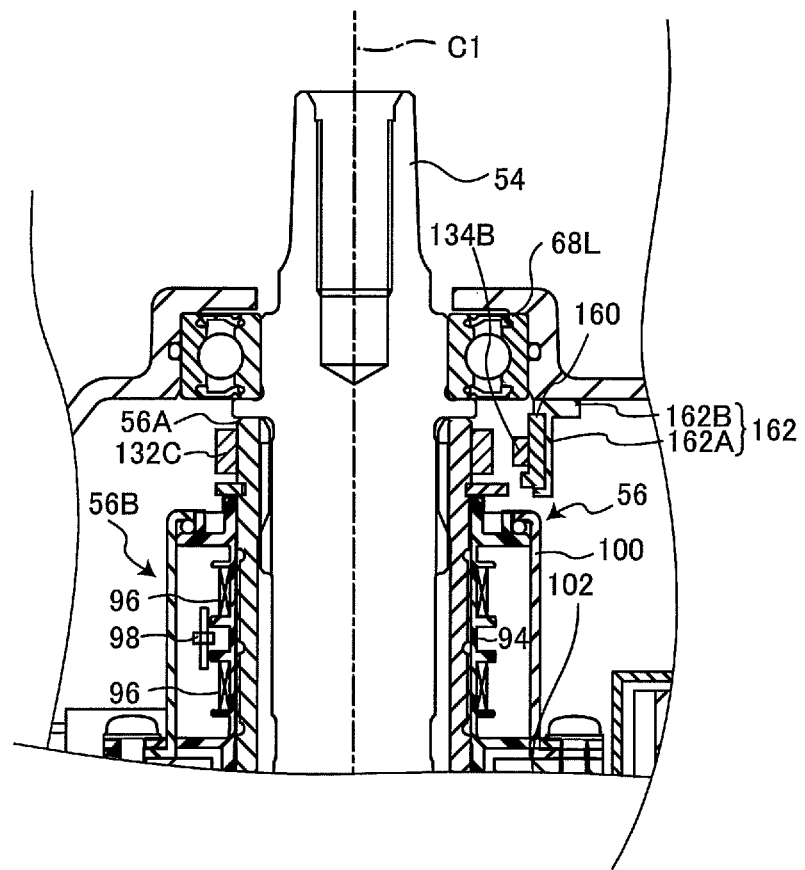
FIG. 14 is an enlarged cross-sectional view of portions of components shown in FIG. 13.

Next, a fifth preferred embodiment of the present invention will be described with reference to FIGS. 13 and 14. FIG. 13 is a cross-sectional view of a driving unit 50D included in an electric assist bicycle of the fifth preferred embodiment. FIG. 14 is an enlarged cross-sectional view of portions of components shown in FIG. 13.

As compared with the driving unit 50A, the driving unit 50D does not include a ring magnet 132A, detector 134, and support member 142. Instead, it includes a ring magnet 132C and detector 134B.

The ring magnet 132C preferably has a geometry and construction similar to those of the ring magnet 132. The ring magnet 132C is provided in a position different from that of the torque detection device 56B as measured in an axial direction of the crankshaft 54. The ring magnet 132C, together with the torque detection device 56B, is provided on the connecting shaft 56A.

At this moment, the ring magnet 132C is in contact with the outer peripheral surface of the connecting shaft 56A. That is, the ring magnet 132C is provided directly on the outer peripheral surface of the connecting shaft 56A. In other words, the ring magnet 132C is fixed to the connecting shaft 56A with no other rotatable member between itself and the connecting shaft 56A.

The ring magnet 132C is located adjacent to the side of the torque detection device 56B opposite to the side adjacent to the one-way clutch 56C as measured in an axial direction of the crankshaft 54. More particularly, the ring magnet 132C is located between the torque detection device 56B and first bearing 68L as measured in an axial direction of the crankshaft 54.

The detector 134B preferably has a construction and functions similar to those of the detector 134. The detector 134B is provided on a substrate 160.

The substrate 160 is attached to the first housing portion 52A via the support member 162. The support member 162 includes a support portion 162A and an attachment portion 162B. The support portion 162A is used to support the detector 134B. The attachment portion 162B is used to attach the substrate 160 to the first housing portion 52A. When the attachment portion 162B is attached to the first housing portion 52A, the support portion 162A extends parallel or substantially parallel to the central axis C1 of the crankshaft 54. Thus, the detector 134B is located opposite to the detected portion 132C such that they are arranged in a direction perpendicular or substantially perpendicular to the central axis C1 of the crankshaft 54.

In the driving unit 50D, the ring magnet 132C is provided on the rotating member 56. Thus, a ring magnet 132C with larger inner and outer diameters may be provided than in implementations where a ring magnet 132C is directly attached to the outer peripheral surface of the crankshaft 54. This results in a ring magnet 132C with a large number of magnetic poles. A ring magnet 132C with a large number of magnetic poles means that the detector 134B provides improved precision in detecting the rotation of the crankshaft 54, i.e., improved detection resolution of the detector 134B. This makes it yet easier to monitor the pedaling effort by the rider.

In the driving unit 50D, the ring magnet 132C is provided in a position different from that of the torque detection device 56B as measured in an axial direction of the crankshaft 54. Thus, the detection resolution of the rotation detection device 130 may be improved while maintaining the precision in torque detection by the torque detection device 56B.

In the driving unit 50D, the ring magnet 132C is provided on the connecting shaft 56A. Thus, no other member is present between the ring magnet 132C and connecting shaft 56A. This facilitates positioning the ring magnet 132B precisely relative to the central axis C1 of the crankshaft 54, thus making it easier to reduce the distance between the ring magnet 132C and detector 134B.

While preferred embodiments of the present invention have been described, the preferred embodiments above are merely examples for carrying out the present invention. Thus, the present invention is not limited to the preferred embodiments above, and the above preferred embodiments may be modified as necessary without departing the spirit of the invention.

In the first preferred embodiment, the ring magnet 132 is preferably attached to the outer peripheral surface of the cylindrical portion 110; alternatively, for example, magnetic poles may be provided on the cylindrical portion 110.

In the second preferred embodiment, the ring magnet 132A is preferably attached to one of the sides of the circular ring 146 disposed along its axis; alternatively, for example, magnetic poles may be provided on the circular ring 146.

In the third preferred embodiment, the light emitter 152 is preferably located adjacent to one of the sides of the circular ring 146 disposed in an axial direction of the crankshaft 54, and the light receiver 154 is located adjacent to the other one of the sides of the circular ring 146 disposed in an axial direction of the crankshaft 54; alternatively, the light emitter 152 and the light receiver 154 may be reversed in position.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A driving unit for use in an electric assist bicycle, the driving unit comprising:
    a housing;
    a crankshaft extending through the housing;
    a magnetostrictive torque detection device located in the housing to detect a torque generated in the crankshaft;
    a rotating member including the magnetostrictive torque detection device, and positioned to be concentric with the crankshaft and rotatable together with the crankshaft; and
    a magnetic rotation detection device located in the housing to detect rotation of the crankshaft; wherein
    the rotating member includes:
        a connecting shaft located at a first end along an axis of the rotating member and coupled with the crankshaft within the housing; and
        an output shaft located at a second end along the axis of the rotating member, a driving sprocket attached to the output shaft;
    the magnetic rotation detection device includes:
        a detected portion provided on the rotating member and located around a central axis of the crankshaft within the housing; and
        a detector configured to detect that the detected portion rotates together with the rotating member;
    the detected portion is provided at a position different from that of the torque detection device in an axial direction of the crankshaft;
    the driving unit includes a support having the detector mounted thereon; and
    the support and the detector are located completely inside the housing.

2. The driving unit according to claim 1, wherein the torque detection device and the detected portion are provided on the connecting shaft.

3. The driving unit according to claim 2, wherein the rotating member further includes a one-way clutch, the one-way clutch is located closer to the driving sprocket than the torque detection device is, the one-way clutch is configured to transfer to the driving sprocket a rotational force that causes the driving sprocket to rotate in a first direction around the central axis of the crankshaft and not to transfer to the driving sprocket a rotational force that causes the driving sprocket to rotate in a direction opposite to the first direction; and
    the detected portion is located adjacent to a side of the torque detection device opposite to a side adjacent to the one-way clutch in the axial direction of the crankshaft.

4. The driving unit according to claim 2, wherein the rotating member further includes a one-way clutch, the one-way clutch is located closer to the driving sprocket than the torque detection device is, the one-way clutch is configured to transfer to the driving sprocket a rotational force that causes the driving sprocket to rotate in a first direction around the central axis of the crankshaft and not to transfer to the driving sprocket a rotational force that causes the driving sprocket to rotate in a direction opposite to the first direction; and
    the detected portion is located between the torque detection device and the one-way clutch as measured in the axial direction of the crankshaft.

5. The driving unit according to claim 2, wherein the housing includes a first housing portion and a second housing portion that are overlaid with each other and arranged in the axial direction of the crankshaft; and
    the detected portion is located closer to overlay surfaces of the first and second housing portions than the torque detection device is.

6. An electric assist bicycle including the driving unit according to claim 1.

* * * * *